US012781551B2

(12) United States Patent
Cole

(10) Patent No.: US 12,781,551 B2
(45) Date of Patent: Nov. 3, 2026

(54) DOOR SECURITY DEVICE

(71) Applicant: The Regents of the University of California, Oakland, CA (US)

(72) Inventor: Caroline Marie Cole, Richmond, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 19/125,727

(22) PCT Filed: Oct. 27, 2023

(86) PCT No.: PCT/US2023/078086

§ 371 (c)(1),
(2) Date: Apr. 29, 2025

(87) PCT Pub. No.: WO2024/097616

PCT Pub. Date: May 10, 2024

(65) Prior Publication Data

US 2026/0110203 A1 Apr. 23, 2026

Related U.S. Application Data

(60) Provisional application No. 63/421,421, filed on Nov. 1, 2022.

(51) Int. Cl.
*E05C 19/18* (2006.01)

(52) U.S. Cl.
CPC .................................. *E05C 19/188* (2013.01)

(58) Field of Classification Search
CPC ...... E05C 19/18; E05C 19/182; E05C 19/184; E05C 19/188; E05B 65/06; E05B 65/0894
See application file for complete search history.

(56) References Cited

U.S. PATENT DOCUMENTS

| | | | | |
|---|---|---|---|---|
| 749,515 A * | 1/1904 | Bail | E05C 19/182 | 292/296 |
| 2,532,586 A * | 12/1950 | Wickwire | E05C 19/18 | 292/288 |
| 3,834,746 A * | 9/1974 | Hinden | E05C 19/182 | 292/DIG. 60 |

(Continued)

OTHER PUBLICATIONS

International Search Report and Written Opinion, PCT/US23/78086; Jan. 24, 2024, 7 pages.

*Primary Examiner* — Kristina R Fulton
*Assistant Examiner* — Emily G. Brown

(57) ABSTRACT

An apparatus and a door securing system are disclosed. The apparatus includes a first segment, a second segment, and a third segment. The first segment includes an enclosed opening. A first end of the second segment is coupled to a second end of the first segment such that a plane of the second segment is perpendicular to a plane of the first segment. A first end of the third segment is coupled to a second end of the second segment such that a plane of the third segment is perpendicular to the plane of the second segment and parallel to the plane of the first segment. The third segment extends away from a back side of the second segment and the first segment extends away from a front side of the second segment. The third segment includes a lip formed on a second end of the third segment.

15 Claims, 22 Drawing Sheets

(56) References Cited

U.S. PATENT DOCUMENTS

| | | | | | |
|---|---|---|---|---|---|
| 4,326,394 | A * | 4/1982 | Stein | E05C 19/182 | 70/14 |
| 4,334,705 | A * | 6/1982 | Rumph | E05C 19/18 | 292/288 |
| 4,770,451 | A * | 9/1988 | Souza | E05C 19/182 | 292/288 |
| 4,955,648 | A * | 9/1990 | Miller | E05C 19/18 | 292/288 |
| 5,291,760 | A * | 3/1994 | Schrader | E05C 19/18 | 292/288 |
| 5,605,365 | A * | 2/1997 | George | E05C 17/166 | 292/DIG. 53 |
| D479,792 | S * | 9/2003 | Winocoor | D8/331 | |
| 7,637,130 | B2 * | 12/2009 | Carr | E05B 47/00 | 292/259 R |
| 7,770,420 | B2 * | 8/2010 | Carr | E05C 19/003 | 292/259 R |
| 12,385,284 | B1 * | 8/2025 | Plemmons | E05B 15/0205 | |
| 2002/0067046 | A1 * | 6/2002 | Cox, Sr. | E05C 19/184 | 292/289 |
| 2003/0034656 | A1 * | 2/2003 | Zemzik | E05C 19/188 | 292/293 |
| 2007/0085352 | A1 | 4/2007 | Ulanday | | |
| 2009/0322106 | A1 | 12/2009 | Wood | | |
| 2011/0192092 | A1 * | 8/2011 | Scott | E05C 3/048 | 70/91 |
| 2017/0081888 | A1 * | 3/2017 | Adams | B60R 25/01 | |
| 2019/0078351 | A1 | 3/2019 | Marsden | | |
| 2023/0147265 | A1 * | 5/2023 | Reger | E05C 19/003 | 70/91 |
| 2023/0184014 | A1 * | 6/2023 | Zeppetelli | E05C 17/54 | 292/258 |
| 2023/0349212 | A1 * | 11/2023 | McIntire | E05C 17/08 | |

* cited by examiner

DOOR SECURITY DEVICE

CROSS REFERENCE TO RELATED APPLICATIONS

This application is a national stage application, filed under 35 U.S. C. § 371, of International Patent Application No. PCT/US23/78086, filed on Oct. 27, 2023, which claims priority to U.S. Provisional Patent Application Ser. No. 63/421,421, filed on Nov. 1, 2022, each of which is incorporated by reference herein in its entirety.

FIELD OF THE INVENTION

The present disclosure relates generally to a device, apparatus, or system to secure an outward swinging door from within the room being secured.

BACKGROUND

Securing a door to classrooms has become a rising concern as the number of school lockdowns has risen over the past few years. Prior art depicts numerous locks, braces, bars, devices, and systems for securing a door against unauthorized entry in emergency situations, such as a school lockdown that requires occupants of a space to quickly barricade a room's entrance as shelter-in-place protocol.

Door handle locks and keypad devices are common ways to secure a door. Although such devices are complete within themselves and are sufficient for their intended use, these methods require having a key or keypad combination code, which can be expensive, burdensome, impractical, or unavailable in some contexts. For example, schools may not provide substitute instructors or other temporary employees with copies of classroom and office keys or security code combinations. Furthermore, university and college faculty may teach in different buildings and in different classrooms that custodians unlock and lock each day; giving all instructors a key to every classroom in which they teach each term is neither cost-effective, easy, nor practical. Keypad devices may also be on timers, connected to alarm systems, or difficult to activate when the room is occupied.

Many door security devices are for doors that open into a room, making them ineffective for outward swinging doors that are increasingly common in public spaces. Currently available door security devices and systems that exist for outward swinging doors consist of multiple parts or pieces, which can make them more expensive to manufacture and prone to malfunctioning or breaking. They can also be complicated to assemble or engage in stressful environments.

Once assembled, installed, or activated, some barricades, devices, and door security systems can take time to remove, and federal law (OSHA) notes that doors must remain free of any device or alarm that could resist emergency use of the exit route if the device or alarm fails. The time it takes to deactivate some door security devices and systems can also limit the time the occupants in a room have to pivot behaviors if a lockdown or other emergency situations were to change.

In addition, many currently available door security devices and systems require some component be attached permanently or semi-permanently to a door, strike plate, door jamb, adjoining wall, floor, or any combination thereof, thereby securing a specific, fixed location. Installing such devices and systems in every room that might be occupied during a lockdown can be expensive or cost-prohibitive for school districts and individual schools with limited budgets, as well as for college and university campuses with numerous buildings.

SUMMARY

According to aspects illustrated herein, there is provided an apparatus and a door securing system. One disclosed feature of the embodiments is an apparatus comprising a first segment, wherein the first segment comprises an enclosed opening, wherein the enclosed opening comprises a circular center and opposing polygonal ends, a second segment, wherein a first end of the second segment is coupled to a second end of the first segment such that a plane of the second segment is perpendicular to a plane of the first segment, and a third segment, wherein a first end of the third segment is coupled to a second end of the second segment such that a plane of the third segment is perpendicular to the plane of the second segment and parallel to the plane of the first segment, wherein the third segment extends away from a back side of the second segment and the first segment extends away from a front side of the second segment, wherein the third segment comprises a lip formed on a second end of the third segment.

In another aspect, the present disclosure provides a door securing system. The door securing system comprises a door security device placed on a door handle of a door and secured against a door jamb of the door and a securing member located around the door handle between a front side of the first segment and a back of the door handle. The door security device comprises a first segment, wherein the first segment comprises an enclosed opening, wherein the enclosed opening comprises a circular center and opposing polygonal ends, a second segment, wherein a first end of the second segment is coupled to a second end of the first segment such that a plane of the second segment is perpendicular to a plane of the first segment, and a third segment, wherein a first end of the third segment is coupled to a second end of the second segment such that a plane of the third segment is perpendicular to the plane of the second segment and parallel to the plane of the first segment, wherein the third segment extends away from a back side of the second segment and the first segment extends away from a front side of the second segment, wherein the third segment comprises a lip formed on a second end of the third segment.

BRIEF DESCRIPTION OF THE DRAWINGS

The teaching of the present disclosure can be readily understood by considering the following detailed description in conjunction with the accompanying drawings, in which.

DETAILED DESCRIPTION

The present disclosure provides an apparatus or system to secure an outward swinging door from within the room being secured. As noted above, securing a door to classrooms has become a rising concern as the number of school lockdowns has risen over the past few years. Prior art depicts numerous locks, braces, bars, devices, and systems for securing a door against unauthorized entry in emergency situations, such as a school lockdown that requires occupants of a space to quickly barricade a room's entrance as shelter-in-place protocol.

Currently available door securing mechanisms are too expensive or cumbersome to install and use on doors. Other types of available door securing mechanisms are for more permanent applications and are difficult to remove.

The present disclosure provides a door securing apparatus or system that is simple to install, lightweight, and easily portable. The apparatus of the present disclosure is small enough to be carried in a backpack, briefcase, bag, or the like, providing a discrete, on-the-go security option for securing an outward swinging door that is not dependent on any furnishings or security apparatus of a particular space.

The door securing apparatus of the present disclosure works on hinged, outward swinging egress doors that swing out to either the left or to the right and that is adaptable to different door handle, door jamb, and casing combinations or measurements, thereby allowing an individual to use a single device in multiple settings. Furthermore, the door securing apparatus of the present disclosure operates without any modification of a door, door jamb, adjoining wall, or floor, as well as an improved door security device that does not mar the finish of the door, door jamb, or adjoining wall; such advantages save schools and organizations installation and possible repair costs. The door securing apparatus cannot be easily removed from outside of a door if an intruder were able to open the door slightly and provides an additional layer of security.

Lastly, the door securing apparatus of the present disclosure provides an improved door security device that can be quickly and completely installed/uninstalled—without tools—from within a classroom, office, or other spaces being secured. These advantages allow a user to minimize risks that may occur from either being in the hallway or keeping the door open, even briefly, when setting the device; to save time so as to focus on other security protocols, such as situating other occupants in the space, notifying authorities of whereabouts, or leaving the room by another way; and to quickly modify earlier security measures and exit the space in a safe, conventional manner if emergency circumstances change.

Figure 1:
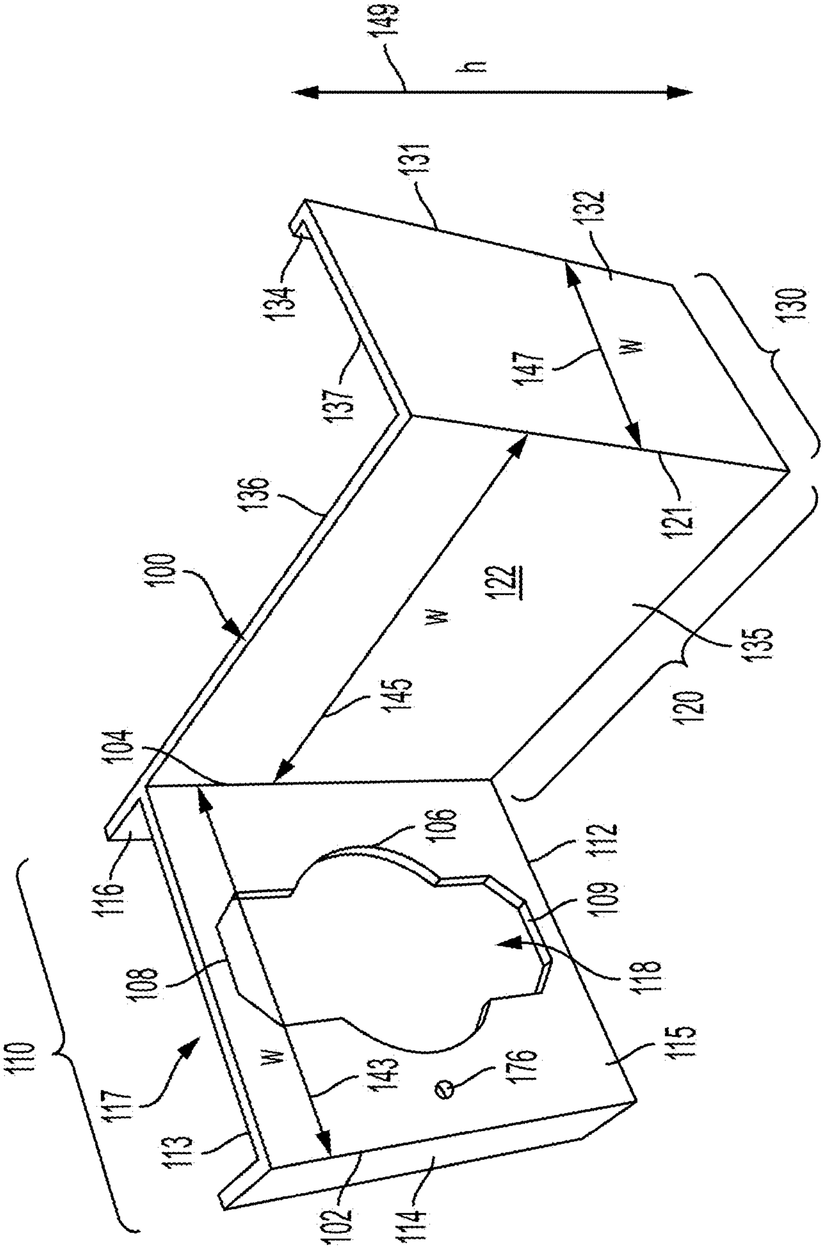
FIG. 1 illustrates a front-perspective view of an example apparatus of the present disclosure.

FIG. 1 illustrates an example of a door securing apparatus 100 of the present disclosure. In an embodiment, the apparatus 100 is a uni-body device (e.g., a single unitary piece). The apparatus 100 may include a first segment 110, a second segment 120, and a third segment 130.

The first segment 110 includes a panel 112 that has a front side 115 and a back side 113. The first segment 110 may include a first bumper 114 and a second bumper 116 coupled to and extending from the back side 113 of the panel 112. The first bumper 114 and the second bumper 116 may be two backs, vertical lips, edges, or bumpers. The first bumper 114 and the second bumper 116 may be perpendicular to a plane of the panel 112.

The first bumper 114 runs vertically along a length of a first edge 102 of the panel 112. The second bumper 116 runs vertically along the length of a second edge 104 of the panel 112. In other words, the first bumper 114 and the second bumper 116 may be located on opposite edges 102 and 104 of the first panel 112. Together, the first bumper 114, the back side 113 of the panel 112, and the second bumper 116 create a U-shaped channel 117.

Figure 3:
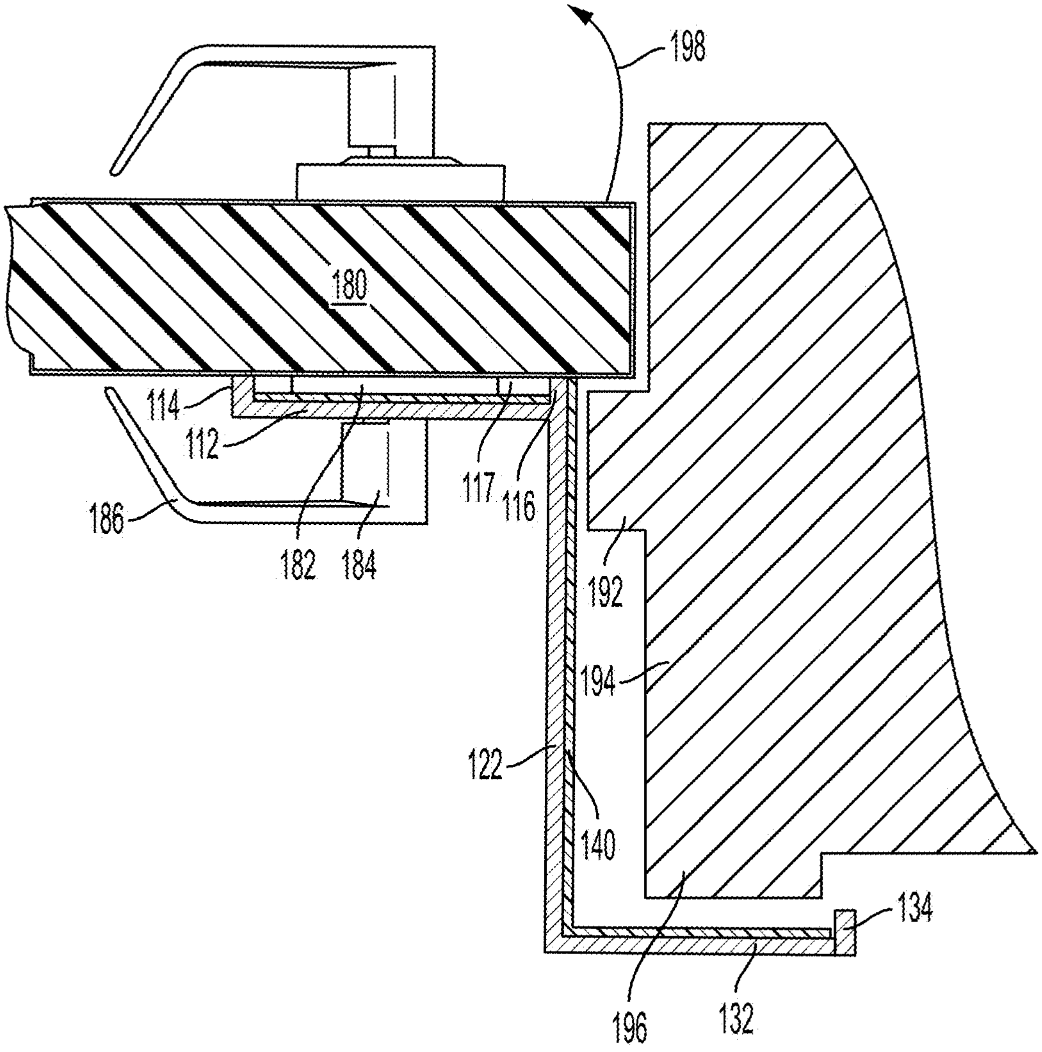
FIG. 3 illustrates a top view of the example apparatus of the present disclosure secured to a door.

FIG. 3 illustrates a top view of the apparatus 100 secured to a door 180. The U-shaped channel 117 keeps the panel 112 from resting against the door 180 and raises the panel 112 of the first segment 110 above a rosette 182 of a door handle.

Referring back to FIG. 1, the panel 112 has an aperture 118. In an embodiment, the aperture 118 is enclosed. In other words, the aperture 118 is free from slots, breaks, or openings around the edge or perimeter of the aperture 118. Said another way, in one embodiment the perimeter of the aperture 118 is a continuous surface. Thus, by being enclosed, the aperture 118 may make it difficult to lift or move the apparatus 100 off of a door handle if an intruder on the inward swinging side of the door 180 manages to open the door 180 slightly.

In other embodiments, the aperture 118 may be designed such that the apparatus 100 may remain on the door handle. In other words, small breaks or openings may be introduced into the aperture 118 that are small enough to allow the apparatus 118 to remain on the door handle.

In some embodiments, the aperture 118 may be edged, lined, or trimmed with a rubber, silicon, or other materials (not shown). The trim would prevent the aperture 118 from scratching the door handle. The trim may also create resistance and prevent the apparatus 100 from moving on one or more planes.

Figure 4:
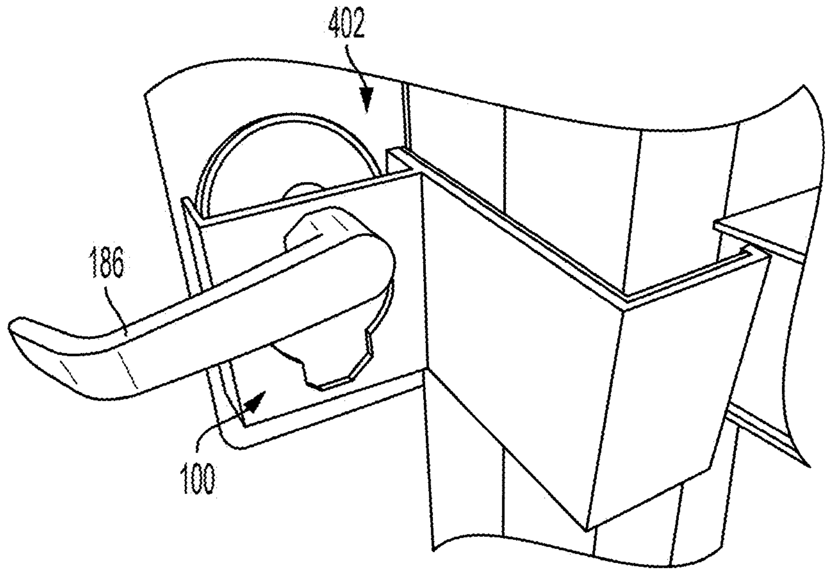
FIG. 4 illustrates a front-perspective view of the example apparatus of the present disclosure placed on a door lever to secure a door that swings out to the left.
Figure 5:
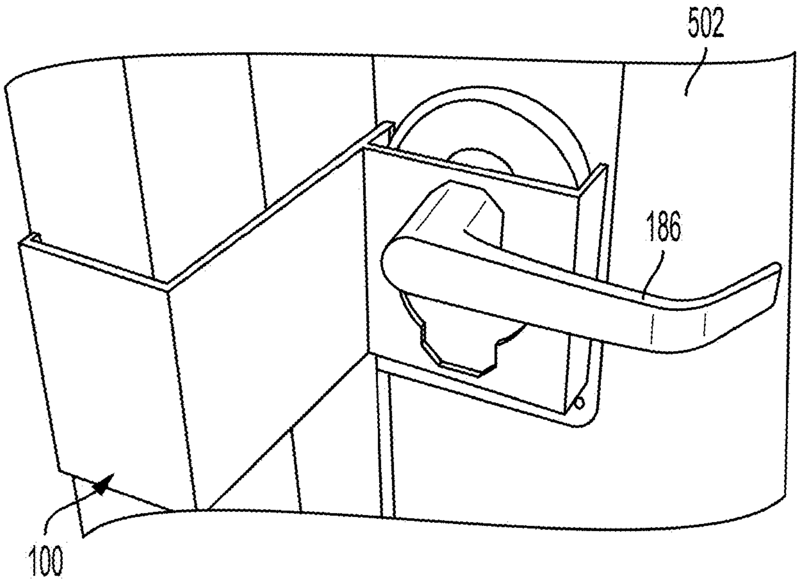
FIG. 5 illustrates a front-perspective view of the example apparatus of the present disclosure placed on a door lever to secure a door that swings out to the right.

The enclosed aperture 118 also allows the user to rotate the apparatus 100 180-degrees to accommodate an egress door 402 that swings open to the left, as shown in FIG. 4, or an egress door 502 that swings open to the right, as shown in FIG. 5.

Referring back to FIG. 1, in one embodiment, the aperture 118 comprises a circular center 106 intersected by polygonal ends 108 and 109. In other words, the polygonal end 108 and the polygonal end 109 are located on opposite sides of the circular center 106. In one embodiment, the polygonal end 108 and the polygonal end 109 are aligned on opposite ends. The polygonal end 108, the polygonal end 109 and the circular center 106 may be aligned such that a line can be drawn through the center of the polygonal end 108, the circular center 106, and the polygonal end 109. Although FIG. 1 illustrates the polygonal end 108, the circular center 106, and the polygonal end 109 arranged vertically, it should be noted that the aperture 118 may be rotated such that the polygonal end 108, the circular center 106, and the polygonal end 109 are slightly rotated around an axis in the center of the circular center 106.

In one embodiment, the polygonal end 108 and the polygonal end 109 may have the same or different polygonal shapes. In one embodiment, the polygonal end 108 and the polygonal end 109 may have the same shape. The polygonal end 108 and the polygonal end 109 may have five sides of equal length as would be arranged in an octagon. The polygonal end 108 and the polygonal end 109 of the aperture 118 may include other shapes to accommodate a variety of differently shaped door handles.

Figure 6:
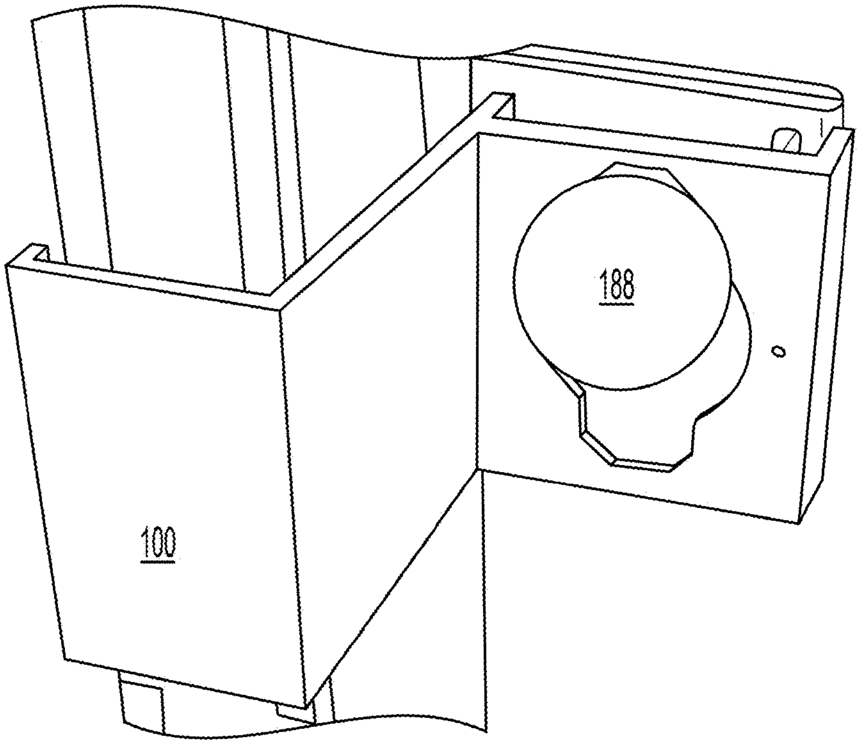
FIG. 6 illustrates a front-perspective view of the example apparatus of the present disclosure placed on a door knob to secure a door that swings out to the right.

For example, in FIG. 4, the apparatus 100 may be placed on a door lever 186 of a door 402 that swings out to the left. In FIG. 5, the apparatus may be placed on a door lever 186 of a door 502 that swings out to the right. Notably, the polygonal end 108 and the polygonal end 109 allow the apparatus to be placed on the door 402 or the door 502 that swing out in either direction. The polygonal end 108 and the polygonal end 109 also allow the apparatus 100 to be placed on a door knob 188 as illustrated in FIG. 6.

In other embodiments, depending on operational factors and materials used, the aperture 118 may have any number of shapes and sizes within the panel 112. For example, the aperture 118 might be edged, lined, or trimmed with rubber, silicon, or other materials, which is not pictured. In addition to minimizing scratches on the door handle, such trim can create resistance, preventing the apparatus 100 from moving on one or more planes.

Referring back to FIG. 1, the second segment 120 may be perpendicular to the first segment 110. In the embodiment, the second segment 120 includes of a single panel 122. The panel 122 may be connected to the panel 112 on the front side 115 and along the edge 104 opposite the second bumper 116 on one end and along an edge 121 to the third segment 130.

In one embodiment, the third segment 130 may include a panel 132. The edge 121 may be coupled to an end of the panel 122 of the second segment 120, as noted above. The panel 132 may extend perpendicular to and away from a back side 136 of the panel 122. Thus, the panel 132 and the panel 112 may extend away from the panel 122 in opposite directions. The panel 132 may be parallel to the panel 112.

In one embodiment, an edge 131 of the panel 132 may be coupled to a lip 134. The lip 134 may run vertically along the entire edge 131 of the panel 132. The lip 134 may extend perpendicularly away from a backside 137 of the panel 132.

Figure 2:
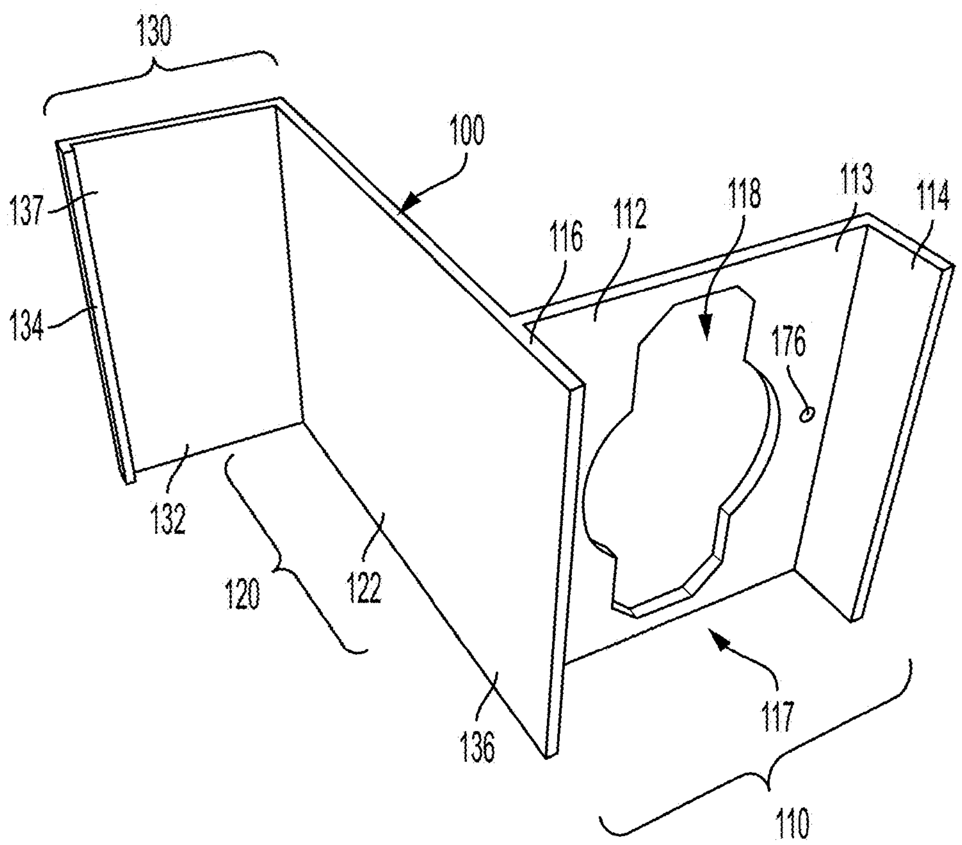
FIG. 2 illustrates a rear-perspective view of the example apparatus of the present disclosure.

FIG. 2 illustrates a rear-perspective view of the example apparatus 100 of the present disclosure. FIG. 2 illustrates the back side 113 of the panel 112, the back side 136 of the panel 122, and the back side 137 of the panel 132. FIG. 2 illustrates how the lip 134 runs vertically along the entire length of the edge 131 of the panel 132. The first bumper 114 and the second bumper 116 may also run vertically along the entire length of the edges 102 and 104, respectively.

In an embodiment, the apparatus 100 may be constructed of steel. However, in other embodiments, depending upon the design and operational factors, the first segment 110, the second segment 120, and third segment 130 may be fabricated from any variety of materials and having the same, or different, thickness.

In one embodiment, the apparatus 100 is fabricated from one plain, unornamented, solid sheet of steel, wherein the first segment 110, the second segment 120, and third segment 130 are integral to one another. By using stock sheet metal, the fabrication cost may be reduced. In other embodiments, the first segment 110, the second segment 120, and third segment 130 may be fabricated separately and attached to one another by any number of connecting means, such as, but not limited to: welding, clamping, bolting, riveting, pinning, and the like.

In an embodiment, a width 143 of the first segment 110, a width 145 of the second segment 120, and a width 147 of the third segment 130 may be different. The first segment 110 may have a width 143 that is wide enough to create the U-shaped channel 117 that can straddle the rosette 182 of a commercial door handle.

The second segment 120 may have a width 145 that can afford some adjustability for variances in door designs and door jambs dimension depending on the date of construction of a building or classroom. In some cases, the width 145 of the second segment 120 may be longer than a door jamb. In other cases, the width 145 of the second segment 120 may allow the third segment 130 to connect with a door facing 196 (shown in FIG. 3, and discussed below). In one embodiment, the width 145 of the second segment 120 may be approximately 122-125 millimeters (mm) wide.

In one embodiment, the width 147 of the third segment 130 may be wide enough to accommodate a width of a door facing 196 (shown in FIG. 3, and discussed below). In one embodiment, the width 147 of the third segment 130 may be approximately 59-65 mm. Although some example lengths are provided above, it should be noted that the width 143, the width 145, and the width 147 may vary depending on the design and operational factors.

In one embodiment, the first segment 110, the second segment 120, and the third segment 130 may have a same height 149. The height 149 should be selected to minimize the chances that a handle of the door lever 186 hits the lower, outside corner of the panel 112 when someone tries to open the door. In one embodiment, the height 149 of the first segment 110, the second segment 120, and the third segment 130 may be approximately 115-127 mm. Although an example height is provided, it should be noted that the height 149 may vary depending on the design and operational factors. In addition, all surfaces of the apparatus 100 may be rounded to prevent injury.

Referring back to FIG. 3, FIG. 3 illustrates an example of the apparatus 100 placed on the door 180 with the door lever 186. As noted above, the door lever 186 may be placed through the aperture 118 so that the apparatus 100 may be placed on a shank 184 of the door lever 186 such that the U-shaped channel 117 keeps the panel 112 from resting against the door 180. An upper portion of the aperture 118 may rest against the shank 184.

The door 180 may rest against a door stop 192 and swing outward as shown by an arrow 198. The width 145 of the panel 122 may be long enough to span the door jamb 194. The second segment 120 may run perpendicular to the door 180 and a door facing 196 and parallel to a door jamb 194. A portion of the second segment 120 may engage an inside wall of the unhinged side of the door jamb 194.

The third segment 130 may run parallel to and in the opposite direction of the door 180 along the door facing 196. A portion of the third segment 130 may engage the door facing 196.

When an intruder attempts to open the door 180, a portion of the third segment 130 may engage the door facing 196. The lip 134 may further engage the door facing 196 and prevent the door 180 from opening outward. In addition, at least a portion of the second segment 120 may engage a portion of the door jamb 194. The combination of engaging segments 120 and 130 prevents the door from being opened from the inward-swing side.

In one embodiment, the apparatus 100 may also include a backing 140. The backing 140 may be located along the back side 113 of the panel 112, back side 136 of the panel 122, and the back side 137 of the panel 132. The backing 140 may be a non-marring backing, coating, or sheathing that lines the back side 113 of the panel 112, back side 136 of the panel 122, and the back side 137 of the panel 132. The backing 140 may protect the door 180, the door jamb 194, and the door facing 196 and create resistance to prevent the apparatus 100 from moving on one or more planes.

Figure 7:
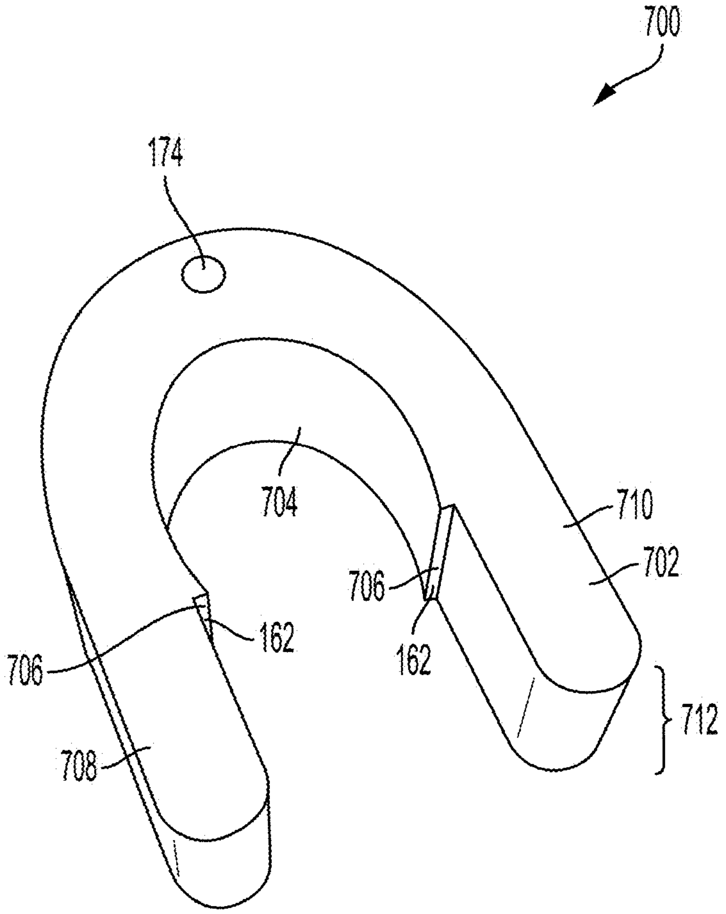
FIG. 7 illustrates a front-perspective view of an example securing member for a door security system of the present disclosure.
Figure 15:
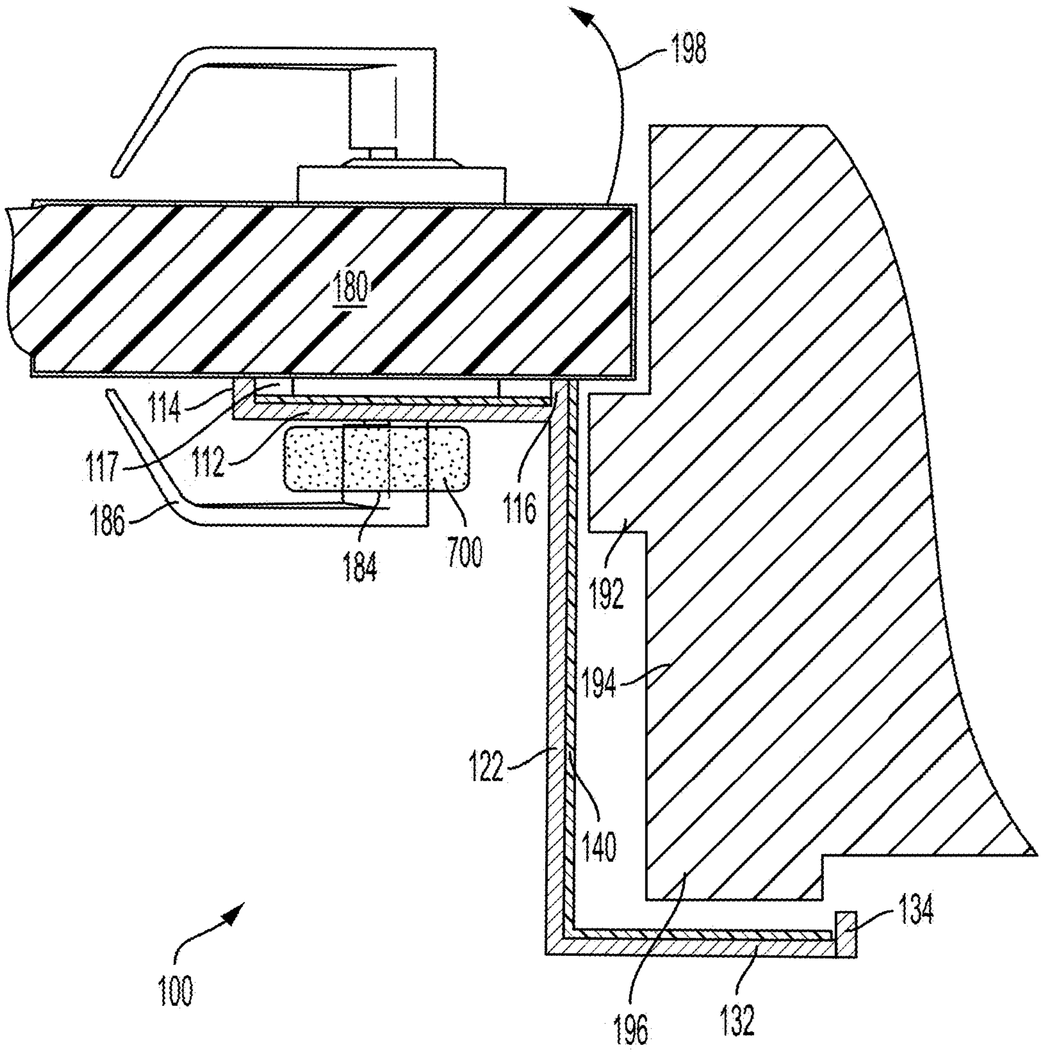
FIG. 15 illustrates a top view that illustrates the example securing member in relationship to the example apparatus of the present disclosure.

FIG. 7 illustrates an example securing member 700 of the present disclosure. The securing member 700 may be a wedge, a chock, and the like, that straddles the shank 184. FIG. 15 illustrates a top view of the securing member 700 straddling the shank 184 between the door lever 186 and the front side 115 of the panel 112. The securing member 700 minimizes the space between the apparatus 100 and the door lever 186 (or doorknob, e.g., the doorknob 188 illustrated in FIG. 6). In other words, the securing member 700 may be used to inhibit lateral and/or rotational movement of the apparatus 100 while an individual tries to forcibly open the door 180.

Referring back to FIG. 7, in one embodiment, the securing member 700 may be shaped like a horseshoe. The securing member 700 may comprise a body 702 with a first member 708 and a second member 710. Two securing tabs 162 (also referred to as a first securing tab 162 and a second securing tab 162) may be positioned opposite from one another on an inner side 704 of the body 702. For example, a first securing tab 162 may be located on the inner side 704 approximately at a midpoint of the first member 708 and the second securing tab 162 may be located on the inner side 704 approximately at a midpoint of the second member 710.

Figure 14:
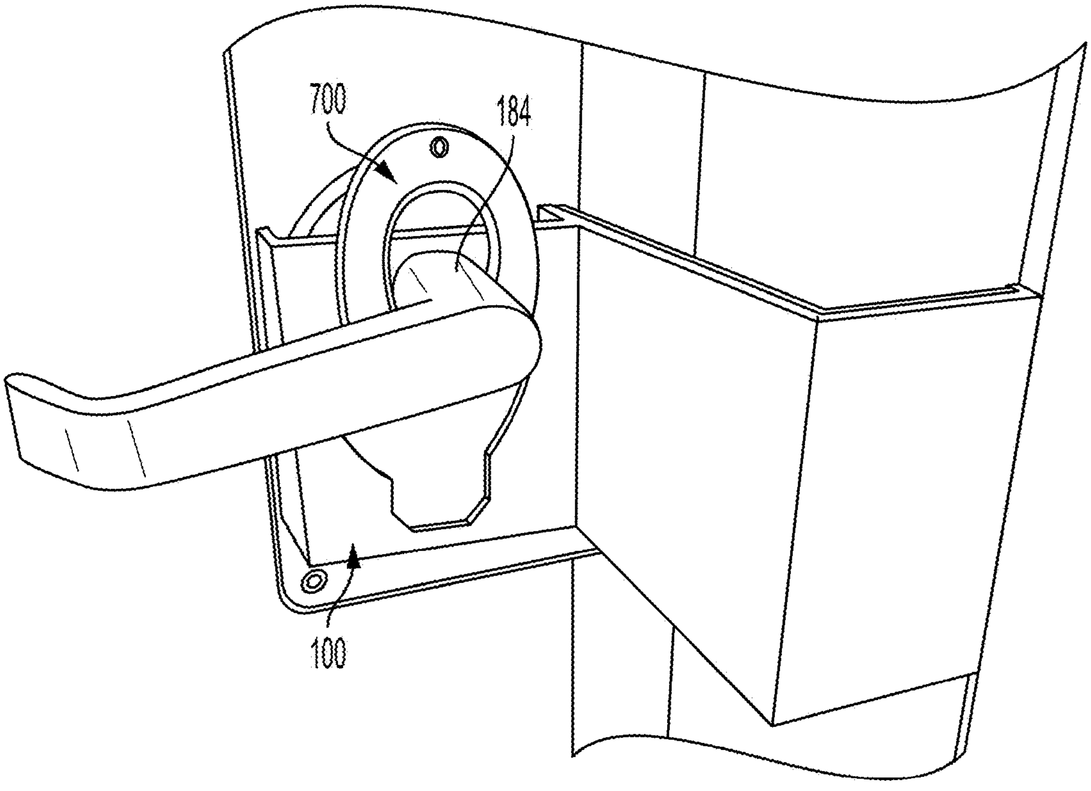
FIG. 14 illustrates a front-perspective view that illustrates the example securing member in relationship to the example apparatus of the present disclosure.

The two securing tabs 162 may each include a raised surface 706 that creates an inclined surface along the inner side 704 of the first member 708 and the second member 710. The first member 708 and the second member 710 may have slight "flex" to allow the first member 708 and the second member 710 to flex away from one another when the securing member 700 is placed around the shank 184, as shown in FIG. 14. As the first member 708 and the second member 710 pass around the shank 184, the first member 708 and the second member 710 may move back towards one another to a resting or default position. The inclined surface formed by the raised surface 706 of the two securing tabs 162 may be positioned around the shank 184 to secure the securing member 700 to the shank 184.

In one embodiment, the securing member 700 may have a thickness based on an amount of space between the door lever 186 and the panel 112.

In one embodiment, the securing member 700 may have a thickness 712 of approximately 6.5 mm. The securing member 700 may be fabricated from plastic, steel, foam, wood, or any other suitable materials.

In one embodiment, the securing member 700 may also include an opening 174. The opening 174 may allow a fastener, a pin, strap, Velcro, and the like to be fitted through the opening 174 and the opening 176 on the panel 112 to secure the securing member 700 to the apparatus 100 during transportation. Thus, the securing member 700 may be kept with the apparatus 100 without being lost. The opening 174 may be included in all of the different embodiments of the securing members illustrated and discussed below.

Figure 8:
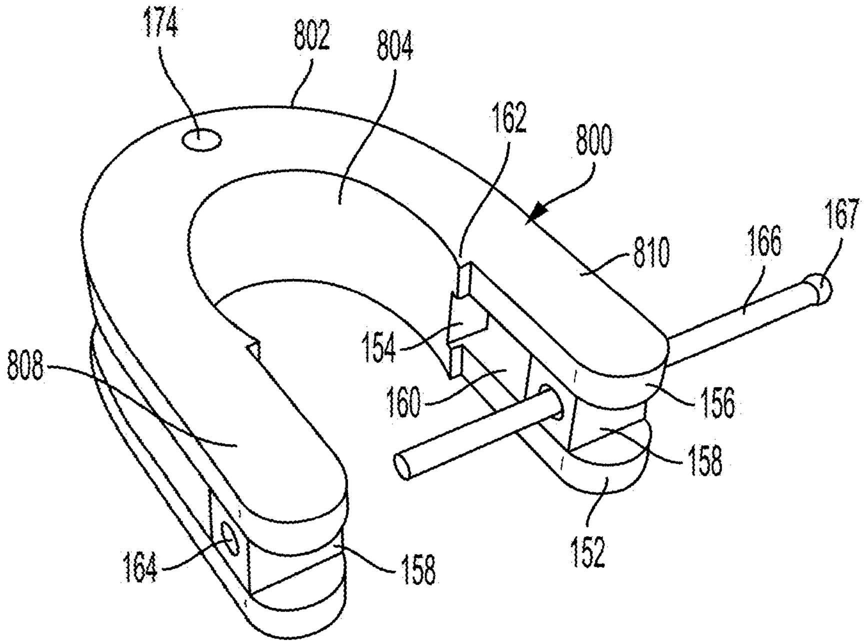
FIG. 8 illustrates a front-perspective view of another example securing member for a door security system of the present disclosure.

FIG. 8 illustrates another embodiment of a securing member 800. The securing member 800 may have a horseshoe shape, similar to the securing member 700. The securing member 800 may have a body 802 with a first member 808 and a second member 810. The securing member 800 may also have two securing tabs 162 along an inner side 804 of the body 802 similarly located as the securing tabs 162 of the securing member 700.

However, the securing member 800 may have three levels. For example, the securing member 800 may have a middle-level 154 that runs along from a midpoint of the first member 808 and the second member 810 and an inner edge 804 of the body 802. A gap 160 may be formed from the middle-level 154 to the ends of the first member 808 and the second member 810. A middle-level connector 158 may be located in the gap 160 towards the ends of the first member 808 and the second member 810. In other words, there may be two middle-level connectors 158 located opposite one another in the gap 160 of the first member 808 and in the gap 160 of the second member 810.

In one embodiment, each middle level connector 158 has a pin hole 164 that runs parallel to the base of the securing member 800. A securing pin 166 can be inserted into the pin holes 164 once the securing member 800 is set on the shank

184 of a door lever 186, keeping the apparatus 100 on the shank 184 should the apparatus 100 rotate as someone tries to open the door.

In one embodiment, the securing pin 166 has an enlarged head 167 on one side that keeps the securing pin 166 from falling through both pin holes 164. Other embodiments may have any number of shapes and sizes for the securing pin 166. Additionally, depending on the operational factors and materials used, other embodiments may have securing pins of different styles, dimensions, and materials. Other embodiments may also use any number of fasteners, including but not limited to: pins, nails, nuts, bolts, screws, retaining rings, and so forth.

Figure 9:
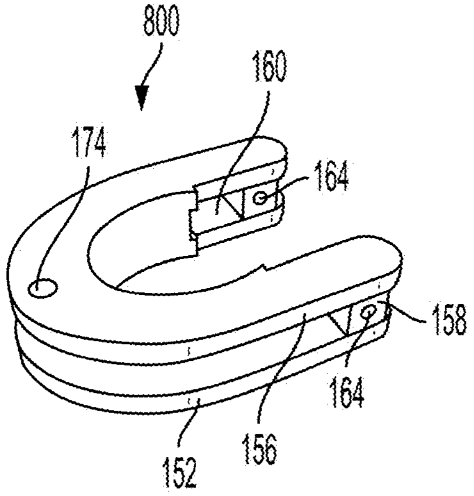
FIG. 9 illustrates a rear-perspective view of the example securing member of the present disclosure.
Figure 10:
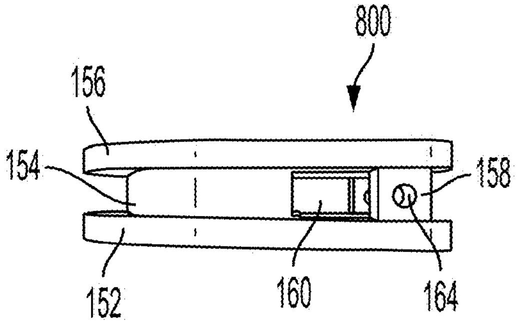
FIG. 10 illustrates a left-side view of the example securing member of the present disclosure.

FIG. 9 illustrates a rear-perspective view of the securing member 800. FIG. 10 illustrates a left-side view of the securing member 800. FIG. 10 illustrates how the middle-level 154 forms the three levels of the securing member 800. FIG. 10 also provides a better view of the gap 160 and the alignment of the pin holes 164.

Figure 11:
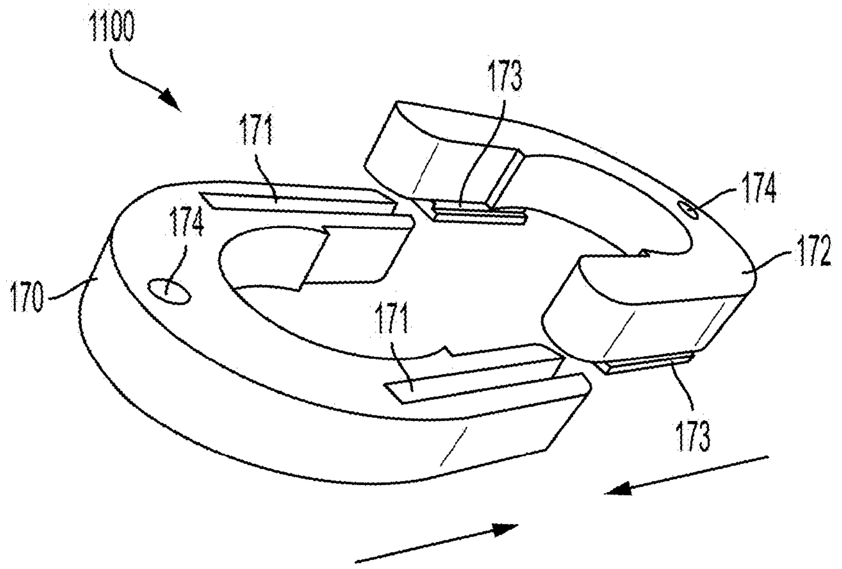
FIG. 11 illustrates a top view of an example two-piece securing member for a door security system of the present disclosure.

FIG. 11 illustrates another embodiment of a securing member 1100. The securing member 1100 may have two pieces. A first piece 170 of the securing member 1100 is shaped like horseshoe and has two securing tabs 162 on the lower, inner edges to keep the securing member 1100 on the shank 184 as someone turns the door lever 186. Carved into each branch of the first piece 170 is an inverted T-shaped channel or groove 171.

A second piece 172 of the securing member 1100 is also shaped like a horseshoe and has two securing tabs 162 on the lower, inner edges to keep the securing member 1100 on the shank 184 as someone turns the door lever 186. On the top of each branch of the second piece 172 is a raised T-shaped slider 173.

By placing the first piece 170 on top of the second piece 172, inverting it, and rotating it 180-degrees, the first piece 170 and the second piece 172 can be slid together over the shank 184 of the door lever 186, interlocking the first piece 170 and second piece 172. This may minimize any space between the apparatus 100 and the inner surface of a door lever 186 or doorknob 188.

In one embodiment, the first piece 170 and second piece 172 may be approximately 11-12 mm thick and made of plastic, creating a combined thickness of approximately 22-24 mm. Other embodiments may be of any variety of thickness and material. Additionally, depending on the operational factors and materials used, other embodiments may have any number of shapes and sizes for the channel 171 in the first piece 170 and/or for the slider 173 in the second piece 172.

Figure 12:
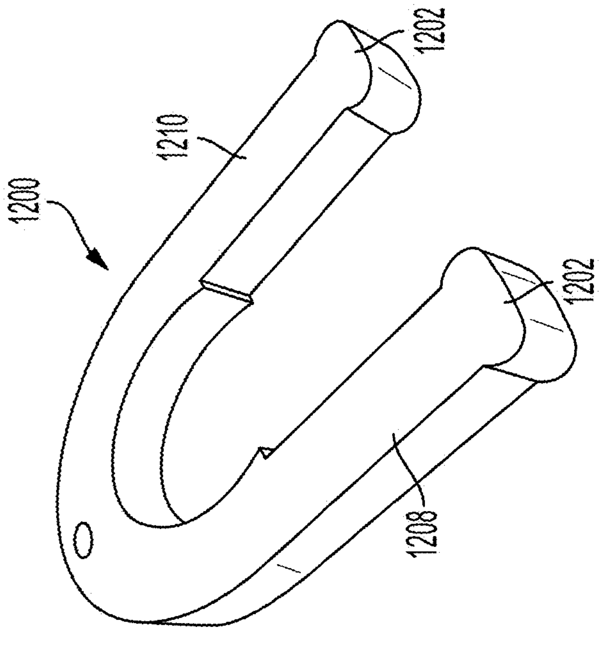
FIG. 12 illustrates a perspective view of another example of a securing member for a door security system of the present disclosure.

FIG. 12 illustrates another embodiment of a securing member 1200. The securing member 1200 may have heels 1202 that have a width that extend beyond a width of each branch or members 1208 and 1210.

Figure 13:
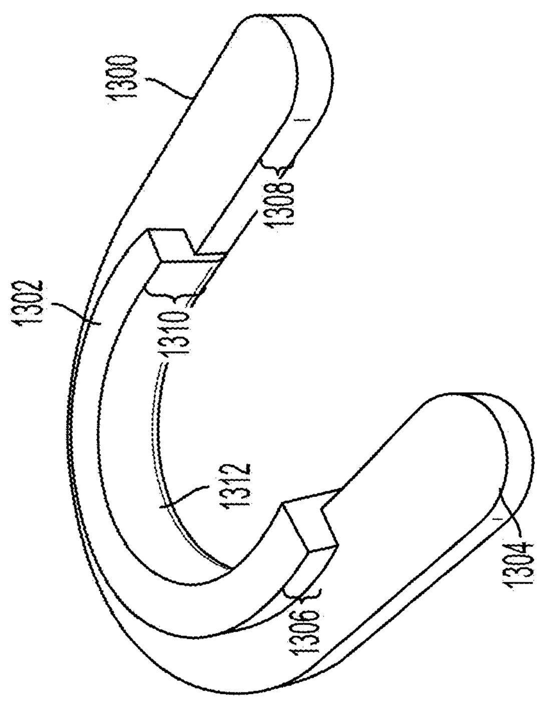
FIG. 13 illustrates a perspective view of another example of a securing member for a door security system of the present disclosure.

FIG. 13 illustrates another embodiment of a securing member 1300. The securing member 1300 may have an elevated lip 1302 that runs along an inner side of body 1304 of the securing member 1300. The securing member 1300 may have a body 1304 having a thickness 1308. The elevated lip 1302 may have a thickness 1306. As a result, a portion of the securing member 1300 may have an overall thickness 1310 that comprises a sum of the thickness 1306 and the thickness 1308.

Figure 16:
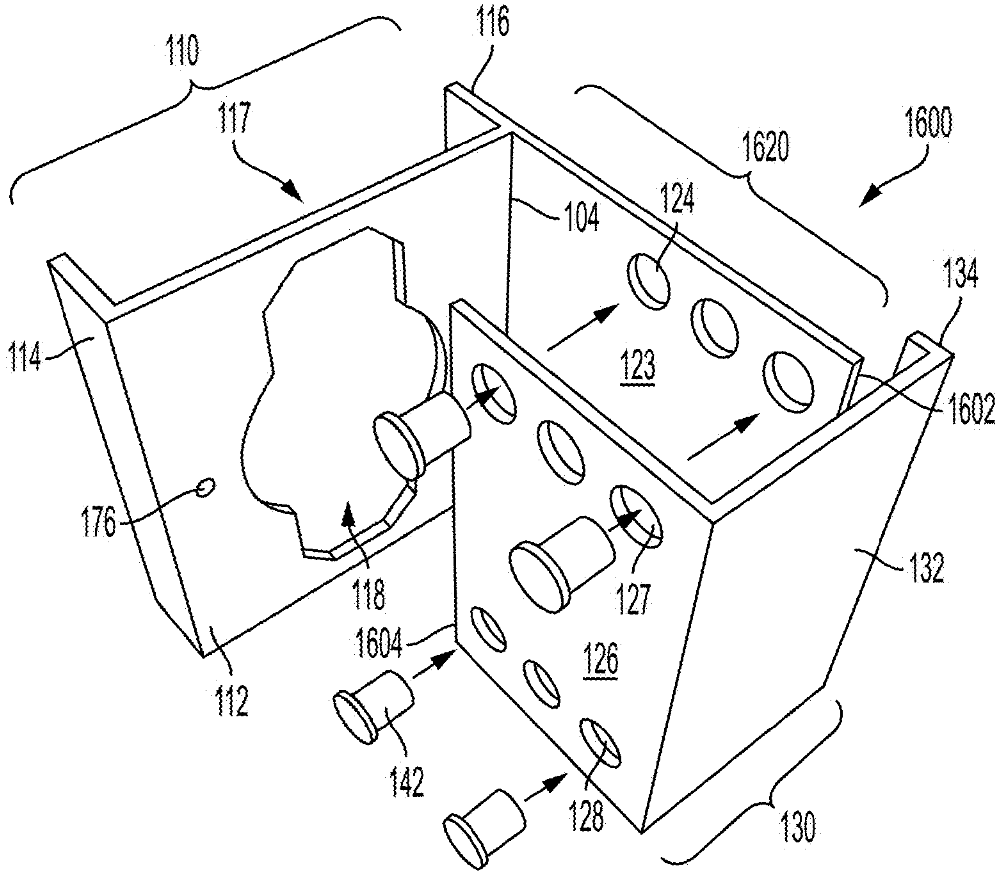
FIG. 16 illustrates a disassembled view of the components of another example apparatus of the present disclosure.

Although FIG. 1 illustrates the apparatus 100 being a single unitary body or piece, in some instances it may be beneficial to have the apparatus 100 as separate pieces. FIG. 16 illustrates an example door security apparatus or device 1600. The apparatus 1600 may be a two-piece, adjustable door security device.

In one embodiment, the apparatus 1600 may be similar to the apparatus 100 in all respects except for a second segment 1620 of the apparatus 1600. The second segment 1620 of the apparatus 1600 may comprise two separate panels 123 and 126.

In one embodiment, the panel 123 is single panel or member that has a row of securing or locking holes 124 running horizontally along the top and a row of securing or locking holes running horizontally along the bottom (not shown). The panel 123 is connected to the panel 112 on the edge 104 opposite the second bumper 116. The distal vertical edge 1602 of the panel 123 is unattached.

The panel 126 is a single panel or member that has a row of securing or locking holes 127 running horizontally along the top and a row of securing or locking holes 128 running horizontally along the bottom. The locking holes along the bottom of the panel 123 that are not shown would be located similarly and aligned with the locking holes 128.

In one embodiment, the locking holes 124, 127, and 128 and the locking holes along the bottom of the panel 123 that are not shown may have any sized diameter based on the size of a fastener. In one embodiment, the locking holes 124, 127, and 128 and the locking holes along the bottom of the panel 123 that are not shown may have a diameter of approximately 12.5 mm.

A vertical edge 1604 of the panel 126 is unattached. The distal vertical edge of the panel 126 is connected to the third segment 130 of the apparatus 1600.

In one embodiment, when the panel 123 and the panel 126 are parallel and aligned, the panel 123 and the panel 126 may be secured together using the upper securing or locking holes 124, 127 and the lower securing or locking holes of the panel 123 and the locking holes 128 of the panel 126.

In one embodiment, the panel 123 and the panel 126 may be secured with a mechanical fastener 142. The mechanical fastener 142 may be a screw, a pin, a friction fit tab, plunger pins, detent pins, cotterless hitch pins, bolts, wingnuts, and the like. In one embodiment, the mechanical fastener 142 may be a quick-release securement pin. In one embodiment, a mechanical fastener 142 may be inserted into at least one pair of aligned locking holes 124 and 127 and at least one pair of aligned locking holes along the bottom of the panel 123 and the locking holes 128. In one embodiment, multiple mechanical fasteners 142 may be used and inserted into multiple aligned locking holes 124 and 127 and 128 and the locking holes along the bottom of the panel 123 or all of the aligned locking holes 124 and 127 and 128 and the locking holes along the bottom of the panel 123.

The design of the panel 123 and the panel 126 allows for adjustability based on a width of a particular door jamb. The width (e.g., measured along the line 145 shown in FIG. 1) of the second segment 1620 can be adjusted for the apparatus 1600. The locking holes 124 and the locking holes not shown on the panel 123 may be aligned horizontally at different widths with the locking holes 127 and 128. Once the desired width is set, the mechanical fastener 142 may be inserted into the aligned holes.

Although FIG. 16 illustrates three locking holes per row, it should be noted that any number of locking holes may be deployed based on a width of the panel 123 and the panel 126 and the desired amount of adjustability. In one embodiment, a width of the panel 123 may be approximately 90-92 mm and a width of the panel 126 may be approximately 63-65 mm. This would provide an adjustable width range between approximately 93 mm to 135 mm.

Figure 17:
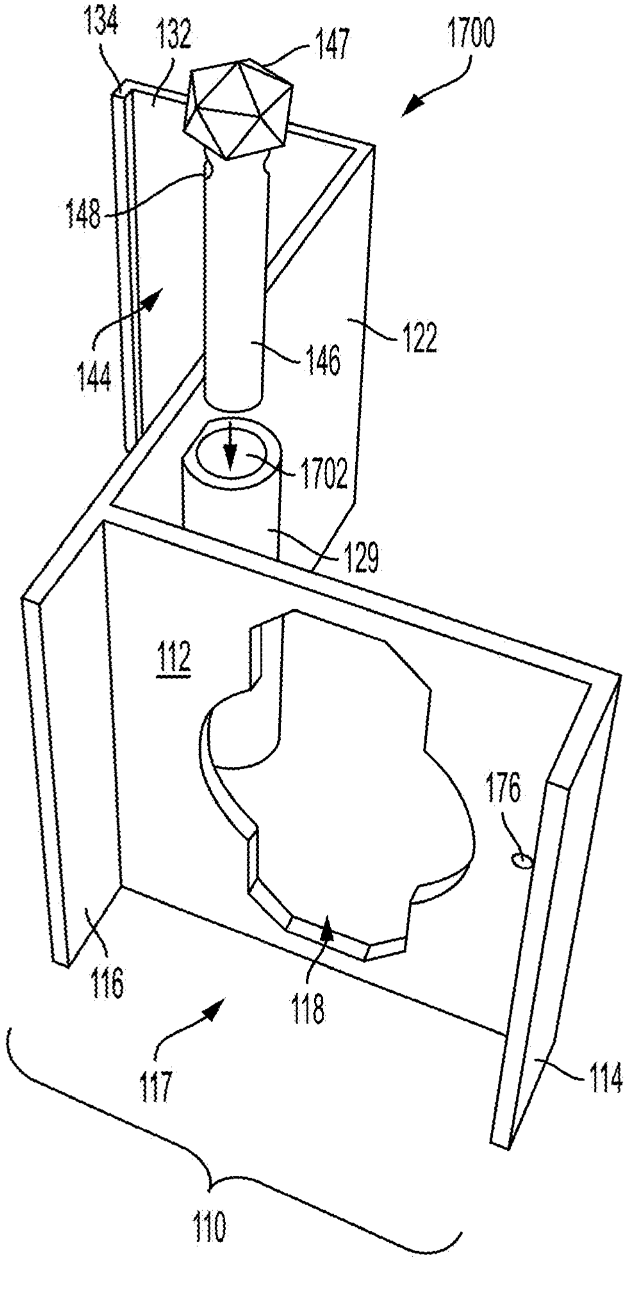
FIG. 17 illustrates a rear-perspective view of the example apparatus of the present disclosure with a securing member.

FIG. 17 illustrates another embodiment of a door security device or apparatus 1700. In one embodiment, the apparatus 1700 may be similar to the apparatus 100 in all respects except for a vertical holder 129.

In one embodiment, the vertical holder 129 may be coupled to a front side 135 of the panel 122 of the second segment 120. The vertical holder 129 may be a tube or pipe with an opening 1702. The vertical holder 129 may be fabricated from the same material as the apparatus 1700. In one embodiment, the vertical holder 129 may be welded onto the panel 122. However, it should be noted that the vertical holder 129 may be molded as part of the panel 122 or attached via any other means including, for example, clamping, bolting, pinning, riveting, with adhesive, and the like.

In one embodiment, the vertical holder 129 may be located near the front side 115 of the panel 112. For example, the vertical holder 129 may be located approximately 7-10 mm away from the front side 115 of the panel 112. However, it should be noted that the vertical holder 129 may be attached anywhere along the panel 122.

In one embodiment, the vertical holder 129 may have an opening diameter that is sufficient to receive a supporting member 144. For example, the vertical holder 129 may have an opening with a diameter of approximately 18.5 mm.

In one embodiment, the supporting member 144 may be inserted into the vertical holder 129. The supporting member 144 may include a cylindrical or tubular body 146 with a head 147. The tubular body 146 may have a diameter that is less than the diameter of the opening of the vertical holder. For example, the tubular body 146 may have a diameter of approximately 12.5 mm. The height of the supporting member 144 may be approximately 85 mm and fabricated from plastic, metal, foam, wood, or any other suitable materials.

In one embodiment, the tubular body 146 may include an opening or hole 148. The hole 148 may provide an opening to insert a string, reusable zip-tie, clip, strap, Velcro strap, and the like to secure the supporting member to the opening 176 on the first segment 110.

The head 147 may have a circular or polygonal shape that has a diameter larger than the tubular body 146 and the diameter of the opening of the vertical holder 129. The head 147 may prevent the supporting member 144 from falling through the vertical holder 129. In addition, the head 147 may provide support for the apparatus 1700 as the door 180 is opened.

Figure 18:
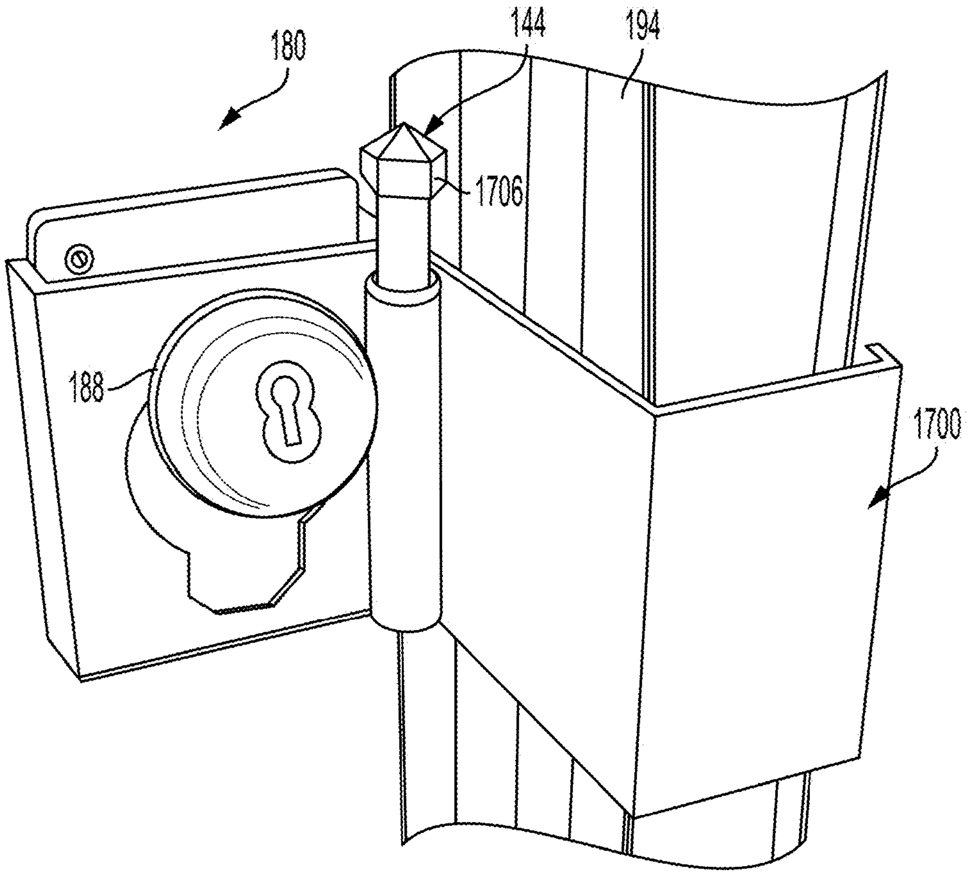
FIG. 18 illustrates a front-perspective view of the example apparatus of the present disclosure with a securing member placed on a door knob of a door.

FIG. 18 illustrates the apparatus 1700 placed on a door knob (or key hole assembly) 188 of a door 180. The support member 144 may be used to hold or secure the apparatus 1700 when placed on the door knob 188. For example, the head 1706 may rest against the door jamb 194 to keep the apparatus 1700 in place and prevent movement on one or more planes when the apparatus 1700 is on the shank 184 of the door lever 186 or the door knob (or key hole assembly) 188.

Figure 19:
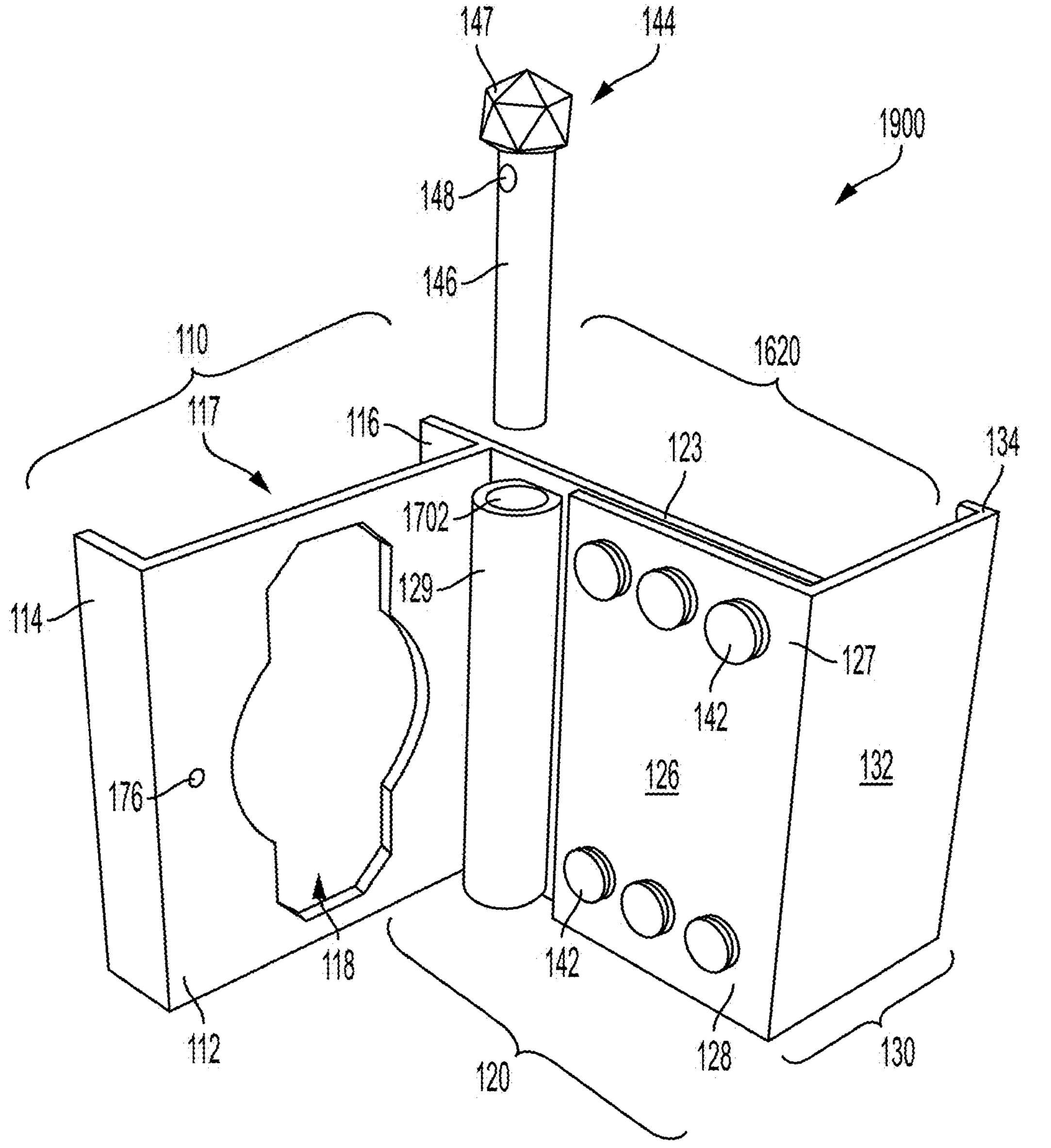
FIG. 19 illustrates a front perspective view of the example apparatus with a combination of features of the present disclosure.

FIG. 19 illustrates an apparatus 1900 of the present disclosure. The apparatus 1900 may include a combination of the features of the apparatus 1600 and the apparatus 1700 discussed above. For example, the apparatus 1900 may include the two piece design of the second segment 1620 and include the vertical holder 129 with the supporting member 144.

Figure 20:
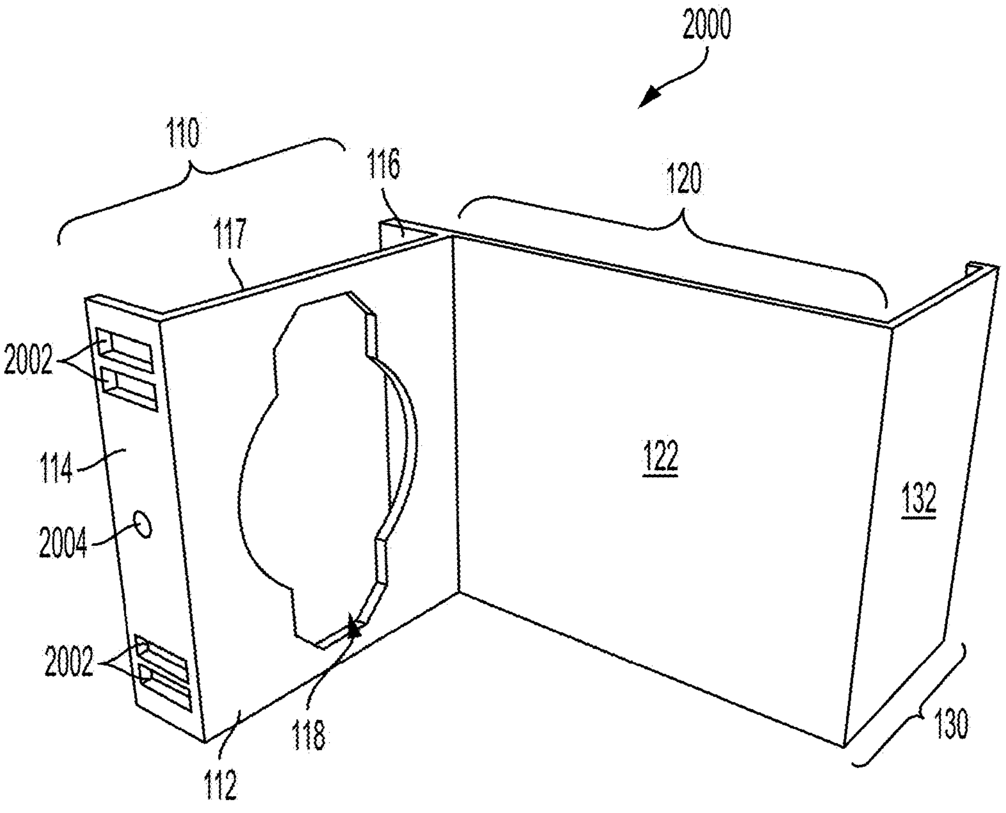
FIG. 20 illustrates a front perspective view of the example apparatus of the present disclosure with additional openings for a securing member.

FIG. 20 illustrates an apparatus 2000 of the present disclosure. In one embodiment, the apparatus 2000 may be similar to the apparatus 100 in all respects except for slots 2002 and an opening 2004.

In one embodiment, the first bumper 114 may include a plurality of slots 2002 and the opening 2004. The slots 2002 may be a rectangular shaped opening that can be positioned horizontally or vertically. One or more slots 2002 may be located above the opening 2004 and the one or more slots 2002 may be located below the opening 2004. The opening 2004 may be located at approximately a center of the first bumper 114.

The slots 2002 may allow a securing member (not shown) to be fed through the slots 2002 and secured around the door lever 186 or the door knob 188. The securing member may be a strap, a bungee cord, a zip tie, a Velcro strip, or any other type of material that can be fitted through the slots 2002 to secure the door lever 186.

Using a strap as an example, a first end of the strap may be secured through the slots 2002 at the top of the first bumper 114. The second end of the strap that is free may be fed around the door lever 186 or the door knob 188 and back towards the slots 2002 at the bottom of the first bumper 114. The second end may then be secured through the slots 2002 at the bottom of the first bumper 114.

In one embodiment, the opening 2004 may allow the securing member (not shown) to be rotatably secured to the first bumper 114. Thus, the securing member may not be lost and can be rotated in either direction depending on if the apparatus 2000 is secured to a door that opens outwardly to the right or the left.

Figure 21:
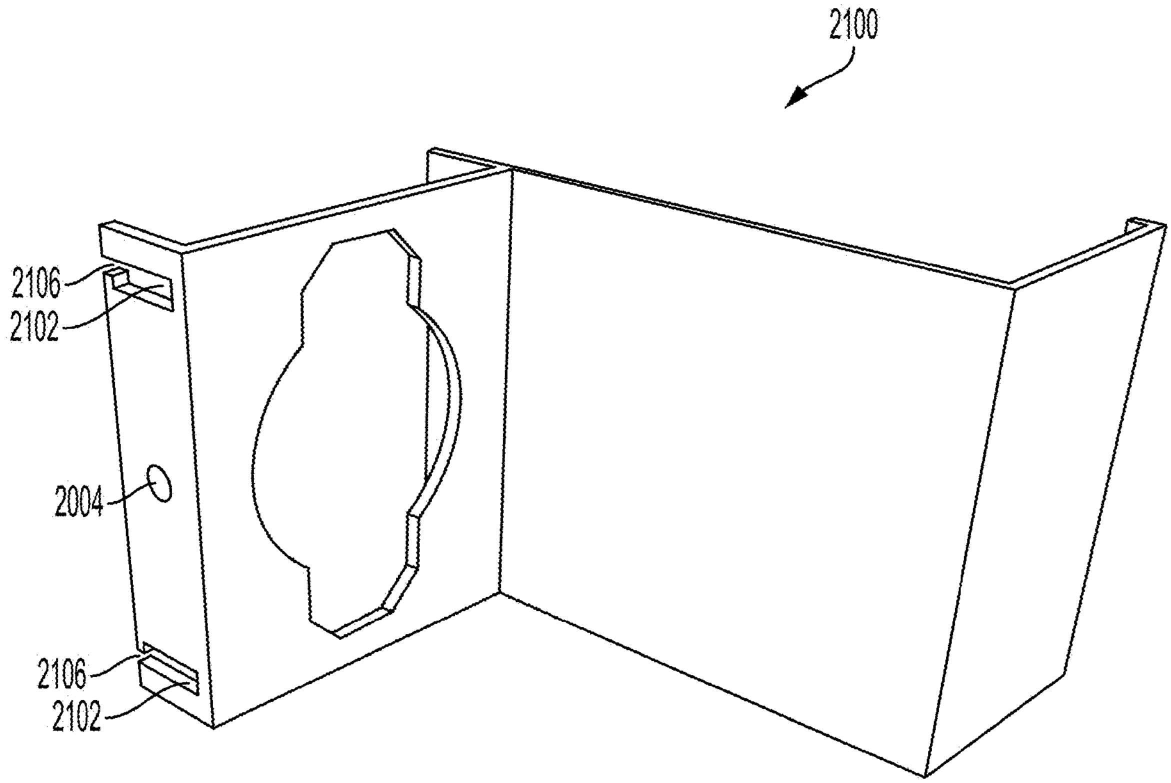
FIG. 21 illustrates a front perspective view of the example apparatus of the present disclosure with additional openings with slots for the securing member.

FIG. 21 illustrates an apparatus 2100. In one embodiment, the apparatus 2100 may be similar to the apparatus 100 and the apparatus 2000 in all respects except for slots 2102.

In one embodiment, the first bumper 114 may include a plurality of slots 2102 and the opening 2004. The slots 2102 may be a rectangular shaped opening that can be positioned horizontally or vertically. One or more slots 2102 may be located above the opening 2004 and the one or more slots 2102 may be located below the opening 2004. The opening 2004 may be located at approximately a center of the first bumper 114.

In one embodiment, the slots 2102 may include a cut-out or notch 2106. The cut-out 2106 may allow a securing member to be more easily inserted through the slot 2102. The slots 2102 may allow a securing member (not shown) to be fed through the slots 2102 and secured around the door lever 186 or the door knob 188, as described above.

Figure 22:
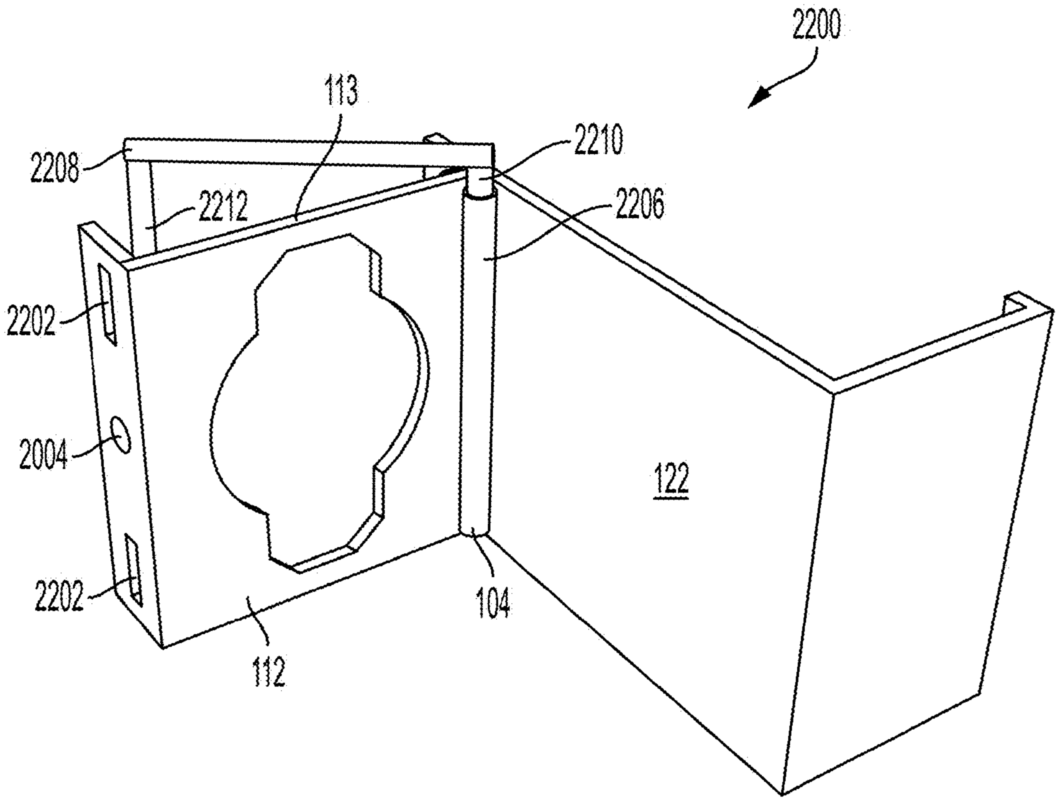
FIG. 22 illustrates a front perspective view of the example apparatus of the present disclosure with a tubular securing member holder and a tubular securing member.

FIG. 22 illustrates an apparatus 2200. In one embodiment, the apparatus 2200 may be similar to the apparatus 100 in all respects except for a vertical holder 2206.

FIG. 22 also illustrates the apparatus 2200 with slots 2202 that arranged vertically. As noted above, the slots 2202 can be arranged horizontally (as shown in FIGS. 20 and 21) or vertically as shown in FIG. 22.

In one embodiment, the vertical holder 2206 may be located along a corner where the edge 104 of the panel 112 meets an end of the panel 122. The vertical holder 2206 may be a cylindrical shape or a tubular shape.

A U-shaped securing member 2208 may be inserted into the vertical holder 2206. The U-shaped securing member 2208 may be fabricated from plastic, metal, steel, wood, or any other suitable materials. The U-shaped securing member 2208 may rotate freely when inserted into the vertical holder 2206. However, the U-shaped securing member 2208 may include ends 2210 and 2212. The end 2210 may be longer than the end 2212. The end 2210 may be inserted into an opening of the vertical holder 2206.

The end 2212 may be positioned on the back side 113 of the panel 112 and behind a door lever 186 or a door knob 188 by lifting the U-shaped securing member 2208 such that the end 2212 clears a top of the panel 112.

Figure 23:
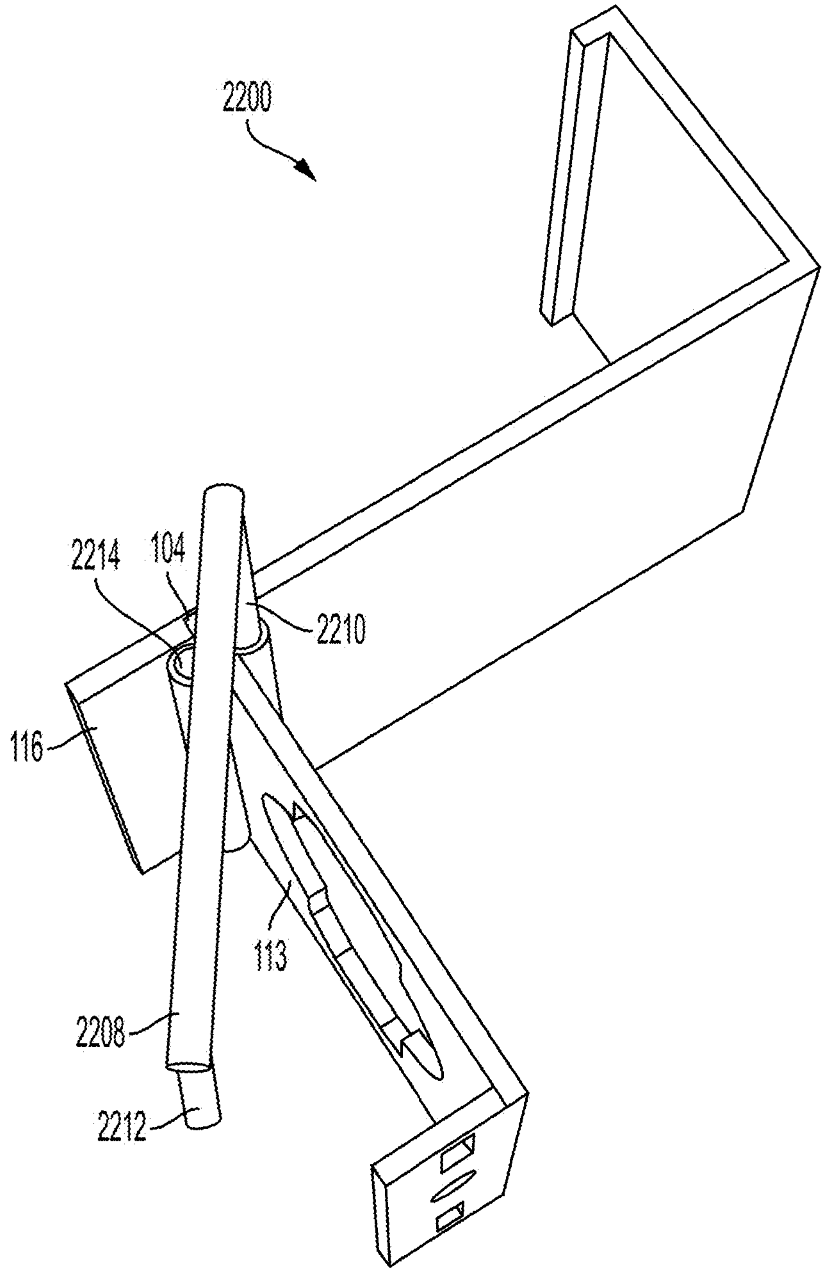
FIG. 23 illustrates a top view of the example apparatus of the present disclosure with the tubular securing member holder and the tubular securing member.

The end 2210 may be allowed to fall into the vertical holder 2206. FIG. 23 illustrates a top view of the apparatus 2200 and how the end 2212 may be rotated and positioned behind the panel 112. The end 2212 may rest against the backside of the door lever 186 or the door knob 188 to secure the apparatus 2200 and prevent movement of the apparatus 2200.

FIG. 23 also illustrates a second vertical holder 2214. The second vertical holder 2214 may be located along a corner where the back side 113 of the edge 104 of the panel 112 meets an end of the second bumper 116. Thus, the apparatus 2200 may have one or more vertical holders 2210 and/or 2214.

Figure 24:
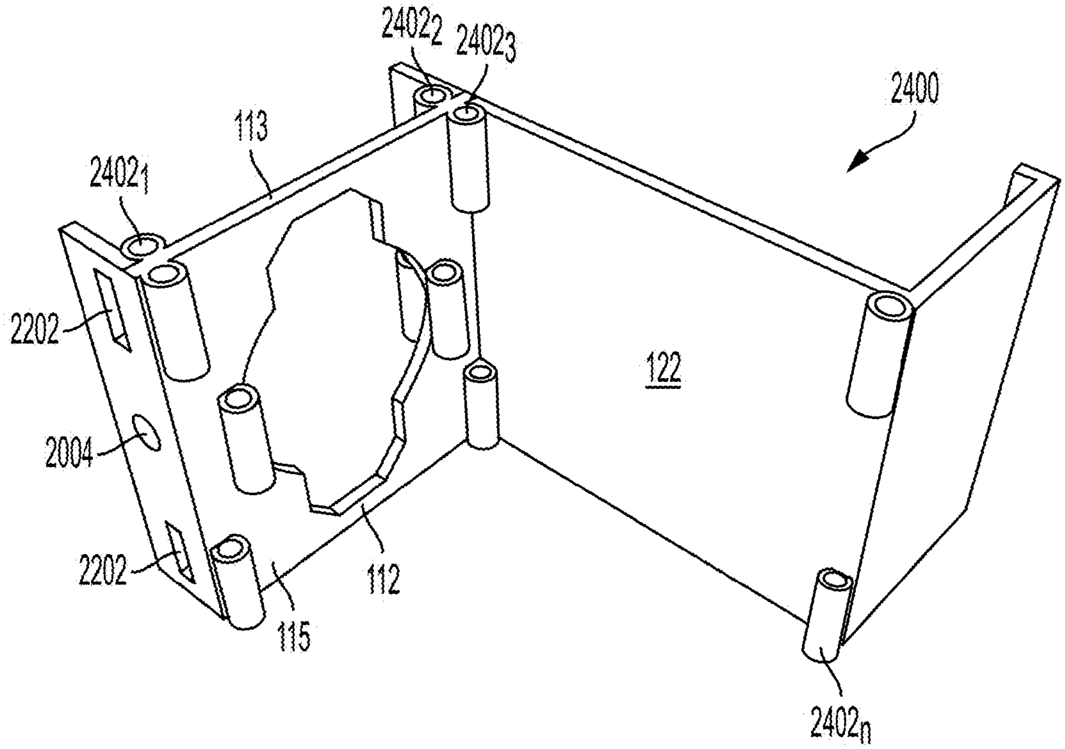
FIG. 24 illustrates a front perspective view of the example apparatus of the present disclosure with different sized tubular securing member holders on various locations of the example apparatus.

Although FIGS. 22 and 23 illustrate vertical holders that run an entire height of the apparatus 2200, it should be noted that the vertical holders may have a shorter height. For example, FIG. 24 illustrates an apparatus 2400 that has vertical holders 24021 to 2402*n* (hereinafter also referred to individually as vertical holders 2402 or collectively vertical holders 2402). The apparatus 2400 may be similar to the apparatus 100 or the apparatus 2200 in all respects except for the vertical holders 2402.

FIG. 24 illustrates vertical holders 2402 that have a height that is shorter than a height of the apparatus 2400. The vertical holders 2402 may be arranged along the panel 122, a front side 115 of the panel 112, or a back side 113 of the panel 112. The U-shaped member 2208 may have various lengths to allow the U-shaped member 2208 to fit into any combination of the vertical holders 2402 to secure the apparatus 2400 to the door 180.

Figure 25:
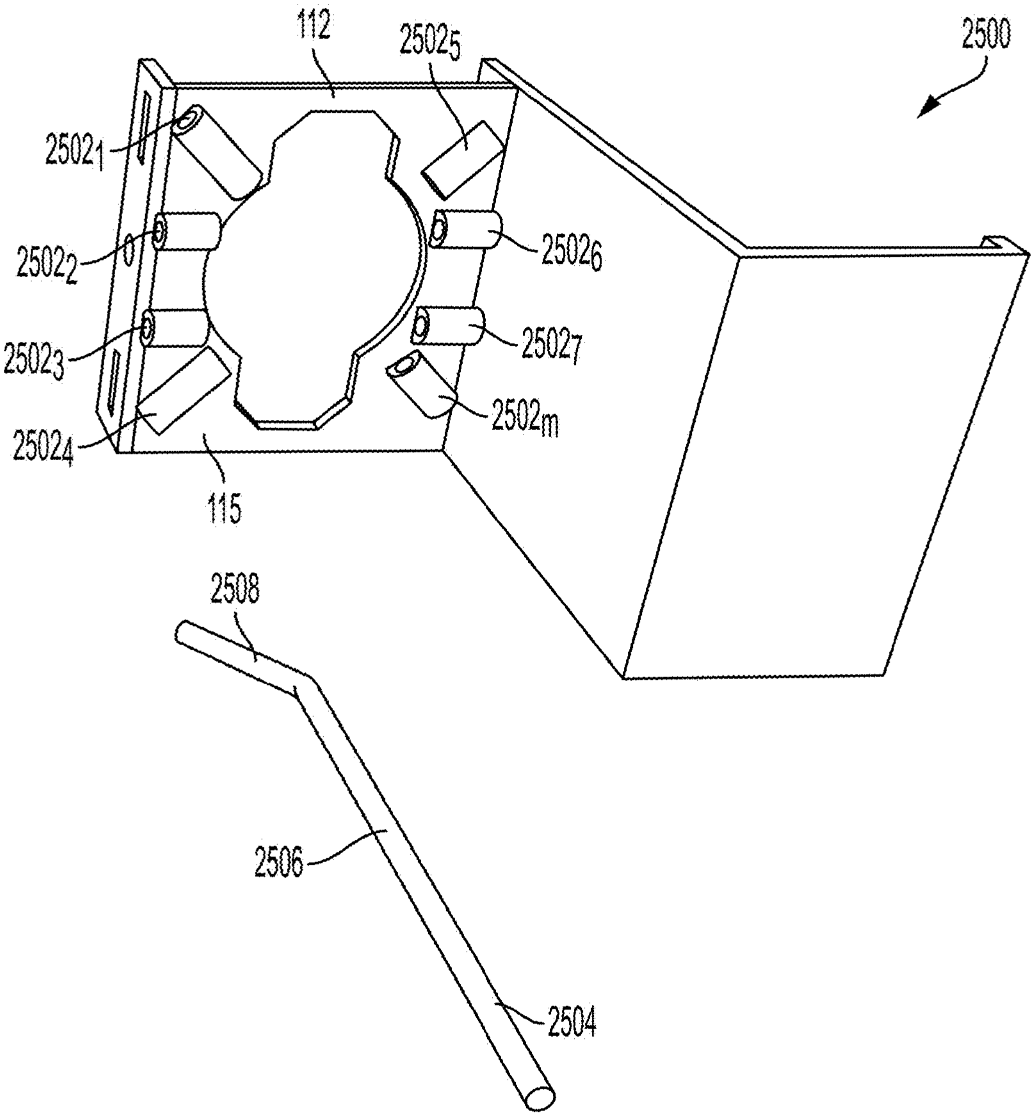
FIG. 25 illustrates a front perspective view of the example apparatus of the present disclosure with another example of different sized tubular securing member holders and another example of a tubular securing member.

FIG. 25 illustrates an embodiment of an apparatus 2500. The apparatus 2500 may be similar to the apparatus 100 or the apparatus 2200 in all respects except for the holders 25021 to 2502*m* (hereinafter also referred to individually as holder 2502 or collectively as holders 2502).

The holders 2502 may be arranged symmetrically around the front side 115 of the panel 112. Although eight holders 2502 are illustrated in FIG. 25, it should be noted that any number of holders 2502 may be deployed.

In one embodiment, a securing member 2504 may be inserted through a pair of the holders 2502 to secure the apparatus 2200 to the door lever 186. In one embodiment, the securing member 2504 may be fabricated from plastic, metal, steel, wood, or any other suitable material.

In one embodiment, the securing member 2504 may include a tubular body 2506 and an angled end 2508. The tubular body 2506 may be inserted through a pair of holders 2502 (e.g., the holder 25021 and the holder 2502*m*, the holder 25023 and the holder 25027, and so forth). The tubular body 2506 may be secured against the back of the door lever 186 to keep the apparatus 2200 secured.

In addition, the angled end 2508 may provide additional security for doors 180 with a door lever 186. For example, as the door lever 186 is depressed to try and open the door 180, the angled end 2508 may interfere with movement of the door lever 186. The interaction between the angled end 2508 and the door lever 186 further cause the apparatus 2500 to move against the door jamb 194 and door facing 196.

Figure 26:
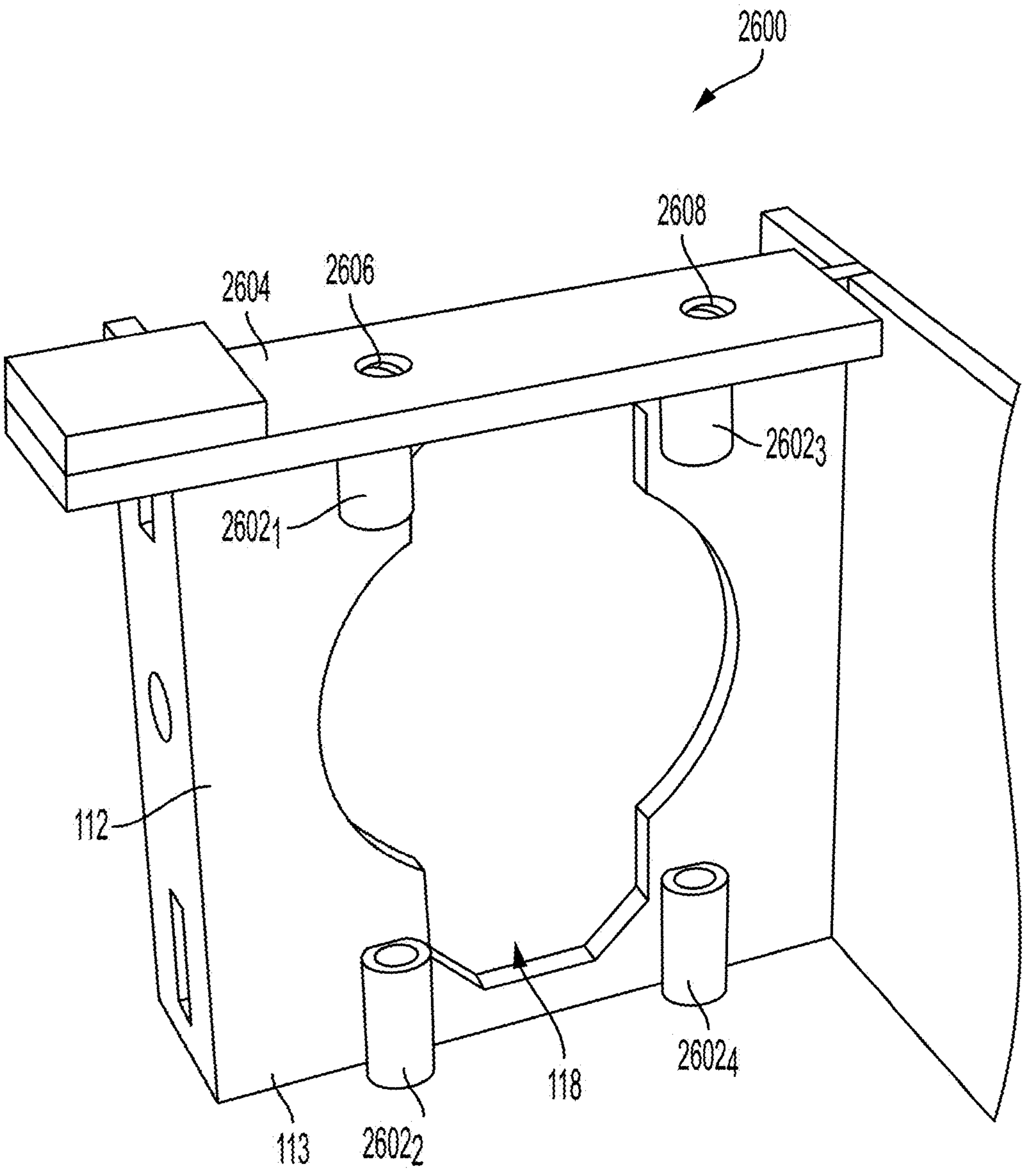
FIG. 26 illustrates a front perspective view of an example apparatus of the present disclosure with a securing cap for the tubular securing member.

FIG. 26 illustrates an embodiment of an apparatus 2600. The apparatus 2600 may be similar to the apparatus 100 or the apparatus 2200 in all respects except for the holders 26021 to 26024 (hereinafter also referred to individually as holder 2602 or collectively as holders 2602) and a securing plate 2604.

FIG. 26 illustrates holders 2602 arranged on the front side 113 of the panel 112. The holders 2602$_1$ and 2602$_2$ may be aligned vertically to one side of the aperture 118. The holders 2602$_3$ and 2602$_4$ may be aligned vertically to another side of the aperture 118 opposite the holders 2602$_1$ and 2602$_2$.

A tube, bar, or securing member (similar to the securing member 2208 or an L-shaped securing member that would look like the securing member 2208 without the end 2212) may be inserted through a combination of one or more of the holders 2602$_1$, 2602$_2$, 2602$_3$, and 2602$_4$.

In one embodiment, to install, the apparatus 2600 may be set on the door lever 186 or the door knob 188 and a U-shaped securing member may be inserted through the bottom holes of the holders 2602$_1$ and 2602$_3$ for a door 180 that swings out to the left. For a door that swings out the right, the U-shaped securing member may be inserted through the bottom holes of the holders 2602$_2$ and 2602$_4$. The U-shaped securing member (e.g., similar to the securing member 2208) would be pushed up to meet the shank 184 of the door lever 186 or the door knob 188 to keep the apparatus 2600 secured.

In another example, an L-shaped securing member (not shown) may be used. The L-shaped member may be inserted through the holes of holders 2602$_1$ for a door 180 that swings out to the left. For a door that swings out to the right, the L-shaped member may be inserted through the holes of the holders 2602$_2$. The L-shaped securing member would be pushed up to meet with the shank 184 of the door lever 186 or the door knob 188 to keep the apparatus 2600 secured.

The securing plate 2604 may include openings 2606 and 2608. The opening 2606 may be aligned with the opening of the holder 2602$_1$ and the opening 2608 may be aligned with the opening of the holder 2602$_3$ when the apparatus 2600 is installed on a door 180 that opens out to the left. When the apparatus 2600 is installed on a door 180 that opens out to the right, the opening 2606 may be aligned with the opening of the holder 2602$_2$ and the opening 2608 may be aligned with the opening of the holder 2602$_4$.

The securing plate 2604 may be fabricated from rubber or a flexible material such that the openings 2606 and 2608 may hold the securing member (both ends of a U-shaped securing member or one end for an L-shaped securing member) in place when inserted through the openings 2606 and/or 2608. In another example, the securing plate 2604 may be fabricated from plastic or metal and the openings 2606 and 2608 may be lined with a rubber liner to provide "grip."

Thus, various embodiments of a door securing device, apparatus, or system are described above. The door securing apparatus or system of the present disclosure provides a lightweight and portable device that can secure outwardly swinging doors from the inside. The door securing apparatus or system can be easy to attach to a door and easily removable. The door securing apparatus or system of the present disclosure is also relatively inexpensive to manufacture and deploy.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus comprising:

a first segment, wherein the first segment comprises an enclosed opening, wherein the enclosed opening comprises a circular center and opposing polygonal ends;

a second segment, wherein a first end of the second segment is coupled to a second end of the first segment such that a plane of the second segment is perpendicular to a plane of the first segment; and a third segment, wherein a first end of the third segment is coupled to a second end of the second segment such that a plane of the third segment is perpendicular to the plane of the second segment and parallel to the plane of the first segment, wherein the third segment extends away from a back side of the second segment and the first segment extends away from a front side of the second segment, wherein the third segment comprises a lip formed on a second end of the third segment.

2. The apparatus of claim 1, wherein the first segment further comprises:

a first bumper coupled to a first end of the first segment; and a second bumper coupled to the second end of the first segment, wherein the first bumper and the second bumper extend away from a back side of the first segment and are each perpendicular to the plane of the first segment.

3. The apparatus of claim 2, wherein the first bumper comprises a plurality of openings to receive a securing member.

4. The apparatus of claim 3, wherein one of the plurality of openings is located at a center of the first bumper to rotatably secure the securing member to the first bumper.

5. The apparatus of claim 1, wherein the second segment comprises a two-piece segment, wherein the two-piece segment comprises:

a first piece of the two-piece segment comprises a first plurality of openings; and a second piece of the two-piece segment comprises a second plurality of openings, wherein at least one of the first plurality of openings and at least one of the second plurality of opening are aligned and mechanically fastened together to a set a desired length and form the second segment.

6. The apparatus of claim 1, wherein the second segment comprises a vertical tube coupled to a front side of the second segment, wherein the vertical tube is to receive a supporting member.

7. The apparatus of claim 6, wherein the vertical tube comprises a plurality of vertical tubes positioned at different locations along the front side of the second segment.

8. The apparatus of claim 6, wherein the first segment comprises a second plurality of vertical tubes positioned at different locations along a front side of the first segment.

9. The apparatus of claim 8, wherein the second plurality of vertical tubes are positioned at different locations along the front side and a back side of the first segment.

10. A door securing system comprising:

a door security device placed on a door handle of a door and secured against a door jamb of the door, the door security device, comprising:

a first segment, wherein the first segment comprises an enclosed opening, wherein the enclosed opening comprises a circular center and opposing polygonal ends;

a second segment, wherein a first end of the second segment is coupled to a second end of the first segment such that a plane of the second segment is perpendicular to a plane of the first segment; and a third segment, wherein a first end of the third segment is coupled to a second end of the second segment such that a plane of the third segment is perpendicular to the plane of the second segment and parallel to the plane of the first segment, wherein the third segment extends away from a back side of the second segment and the first segment extends away from a front side of the second segment, wherein the third segment comprises a lip formed on a second end of the third segment; and a securing member located around the door handle between a front side of the first segment and a back of the door handle.

11. The door securing system of claim 10, wherein the first segment comprises an opening to secure the securing member to the first segment when the door securing system is uninstalled.

12. The door securing system of claim 11, wherein the securing member comprises:

a horseshoe shaped body;

a first securing tab on a first inner side of the horseshoe shaped body; and a second securing tab opposite the first securing tab on a second inner side of the horseshoe shaped body.

13. The door securing system of claim 11, wherein the securing member comprises:

a horseshoe shaped body;

a first opening on a first end of the horseshoe shaped body; and a second opening on a second end of the horseshoe shaped body, wherein the first opening and the second opening are aligned to receive a securing pin.

14. The door securing system of claim 11, wherein the securing member comprises:

a first horseshoe shaped body, comprising:

a first slotted opening in a first end of the first horseshoe shaped body; and a second slotted opening in a second end of the first horseshoe shaped body; and a second horseshoe shaped body, comprising:

a first sliding member on a first end of the second horseshoe shaped body; and a second sliding member on a second end of the second horseshoe shaped body, wherein the first sliding member is inserted into the first slotted opening and the second sliding member is inserted into the second slotted opening to couple the second horseshoe shaped body to the first horseshoe shaped body.

15. The door securing system of claim 10, wherein the second segment comprises a vertical tube on a front side of the second segment and the securing member comprises a U-shaped tube, wherein a first end of the U-shaped tube is inserted into the vertical tube and a second end of the U-shaped tube is located around the door handle between the back side of the first segment and the door.

* * * * *